(12) United States Patent
Hensgen et al.

(10) Patent No.: US 11,939,684 B2
(45) Date of Patent: Mar. 26, 2024

(54) USE OF SULFIDIC COMPOSITIONS

(71) Applicant: TRIBOTECC GMBH, Arnoldstein (AT)

(72) Inventors: Lars Hensgen, Klagenfurt (AT); Ulf-Peter Apfel, Bochum (DE); Mathias Smialkowski, Hattingen (DE)

(73) Assignee: TRIBOTECC GMBH, Arnoldstein (AT)

( * ) Notice: Subject to any disclaimer, the term of this patent is extended or adjusted under 35 U.S.C. 154(b) by 480 days.

(21) Appl. No.: 17/426,731

(22) PCT Filed: Feb. 21, 2020

(86) PCT No.: PCT/EP2020/054633
§ 371 (c)(1),
(2) Date: Jul. 29, 2021

(87) PCT Pub. No.: WO2020/169806
PCT Pub. Date: Aug. 27, 2020

(65) Prior Publication Data
US 2022/0106693 A1    Apr. 7, 2022

(30) Foreign Application Priority Data

Feb. 21, 2019 (EP) .................................. 19158640

(51) Int. Cl.
*C25B 11/047* (2021.01)
*C25B 1/04* (2021.01)
*C25B 11/042* (2021.01)

(52) U.S. Cl.
CPC .............. *C25B 11/047* (2021.01); *C25B 1/04* (2013.01); *C25B 11/042* (2021.01)

(58) Field of Classification Search
None
See application file for complete search history.

(56) References Cited

FOREIGN PATENT DOCUMENTS

WO    WO2018098451    5/2018

OTHER PUBLICATIONS

Konkena et al "Pentlandite rocks as sustainable and stable efficient electrocatalysts for hydrogen generation" Nature Communications, 2016, 12269. (Year: 2016).*

(Continued)

*Primary Examiner* — Brian W Cohen
(74) *Attorney, Agent, or Firm* — Workman Nydegger

(57) ABSTRACT

The present invention relates to the use of a composition of formula (I): $Fe_{9-a-b-c}Ni_aCo_bM_cS_{8-d}Se_d$, wherein M stands for one or more elements having in the ionic state an effective ionic radius in the range of 70-92 pm, a is a number within the range of $2.5 \leq a \leq 3.5$, more preferably $2.7 \leq a \leq 3.3$, b is a number within the range of $1.5 \leq b \leq 5.0$, more preferably $1.5 \leq b \leq 4.0$, most preferably $2.5 \leq b \leq 3.5$, c is a number within the range of $0.0 \leq c \leq 2.0$, more preferably $0.0 \leq c \leq 1.0$, d is a number within the range of $0.0 \leq d \leq 4.0$, more preferably $0.0 \leq d \leq 1.0$, wherein the sum of a, b and c is in the range of $5 \leq a+b+c \leq 8$ and wherein $\geq 90$ wt. % of the composition is in the pentlandite phase for electrocatalytic splitting of water, preferably for hydrogen evolution reaction.

21 Claims, 12 Drawing Sheets

(56) References Cited

OTHER PUBLICATIONS

Bentley et al "Local Surface Structure and Composition Control the Hydrogen Evolution Reaction on Iron Nickel Sulfides" Angewandte Chemie, 2018, 57(15), 4093-4097 (Year: 2018).*
Piontek et al "Influence of the Fe:Ni Ratio and Reaction Temperature on the Efficiency of FexNi1-x)¬S8" ACS Catalysis, 2018, 8(2), 987-996. (Year: 2018).*
International Search Report issued in PCT/EP2020/054633 dated Apr. 5, 2020.
Klein, Frieder; Bach. Wolfgang (2010): (Table A2) Chemical composition of Pentlandite of ODP holes 209-1268A, 209-1270D, 209-1271 Band 209-1274A. Pangaea, https://doi.org/10.1594/PANGAEA.736000.
Helmut Schrocke, et al., "Mineralogie: Ein Lehrbuch Auf Systematischer Grundlage", Jan. 1, 1981, p. 137.
Anonymous: "Pentlandite", Mineral Data Publishing, Jan. 1, 2001, p. 307.
Anonymous: "Mineralienatlas Lexikon Villamaninit", Jan. 1, 1999.
Wang et al., "FeCoNi Sulphide Derived Nano-dots as Electrocatalysts for Efficient oxygen evolution reaction", Functional Materials Letters, 2018, vol. 11, No. 3, pp. 1-5.
Zakrzewski, M.A., 1984, "Minerals of the bravoitevillamaninite series and cuprian siegenite" from Karniowice, Poland. The Canadian Mineralogist, 22(3), pp. 499-502.
Liu, K., et al. 2016, "CoS 2x Se 2 (1-x) nanowire array: an efficient ternary electrocatalyst for the hydrogen evolution reaction" Nanoscale, 8(8), pp. 4699-4704.
Tang, Y. et al., "Phase-pure pentlandite Ni 4.3 Co 4.7 S 8 binary sulfide as an efficient bifunctional electrocatalyst for oxygen evolution and hydrogen evolution," (2018), Nanoscale, 10(22), pp. 10459-10466.
Kitakaze, A. et al., "The phase relations between Fe4. 5Ni4. 5S8 and Co9S8 in the system Fe—Ni—Co—S at temperatures from 400 to 1100 C." (2004), The Canadian Mineralogist, 42(1), pp. 17-42.
Zou, Z., et al., "An Fe-doped nickel selenide nanorod/nanosheet hierarchical array for efficient overall water splitting." (2019) Journal of Materials ChemistryA, 7(5), pp. 2233-2241.
Kaneda, H. et al., "Stability of pentlandite in the Fe—Ni—Co—S system," (1986), Mineralium Deposita, 21, pp. 169-180.

* cited by examiner

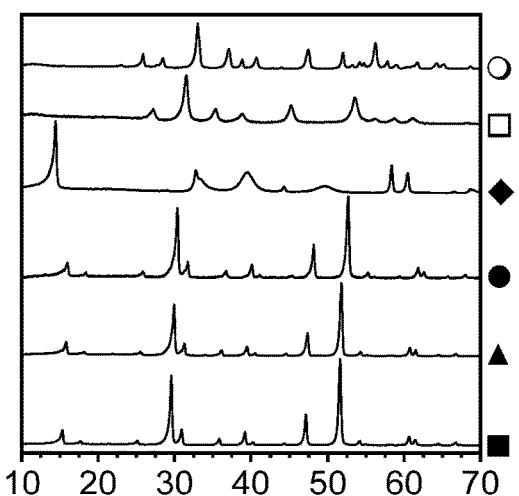 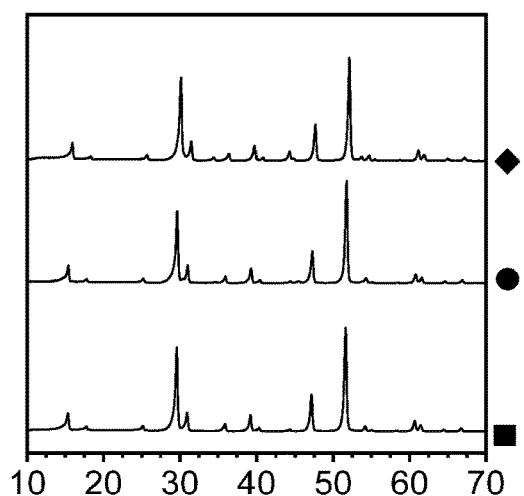
FIG. 7A　　　　　　　　　　　FIG. 7B
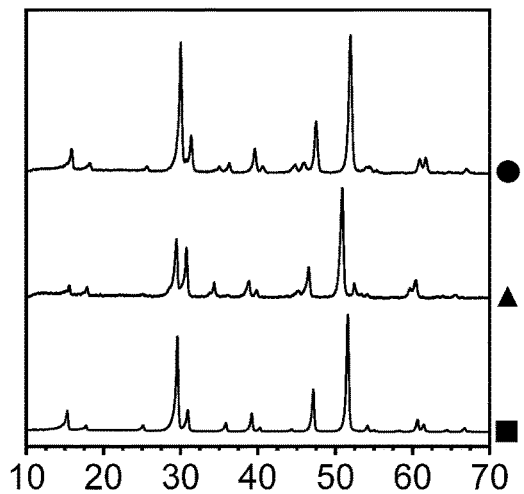 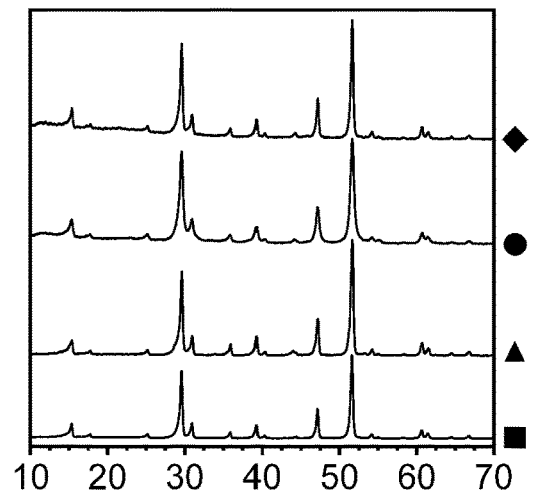
FIG. 7C　　　　　　　　　　　FIG. 7D
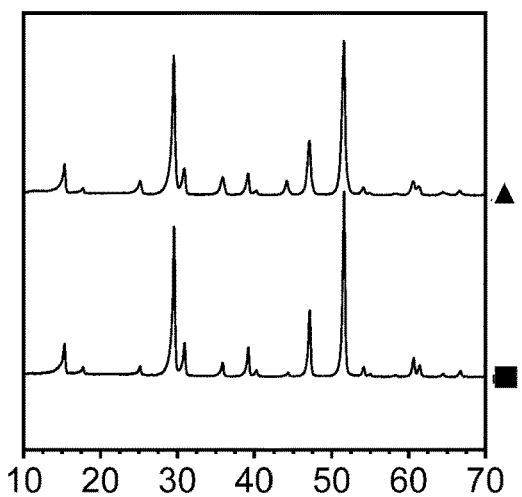
FIG. 7E

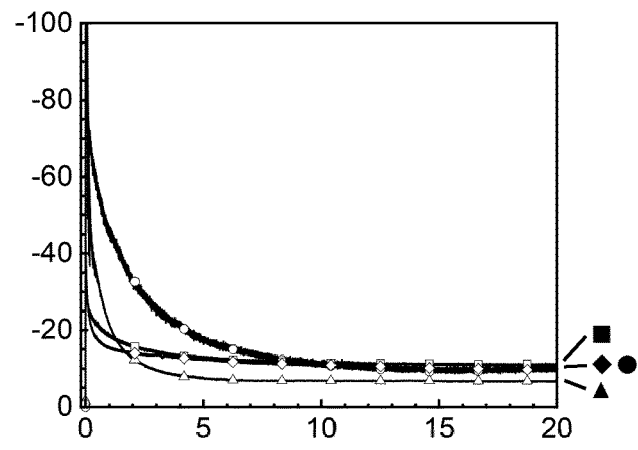
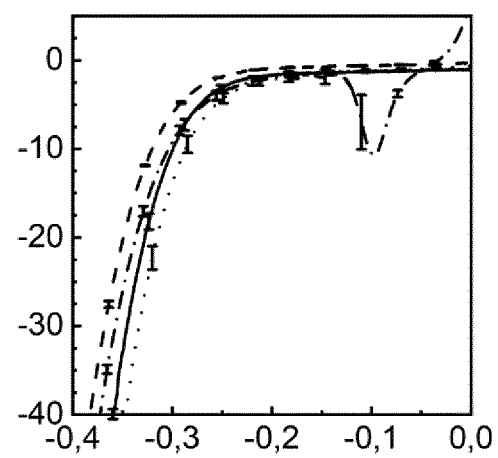
FIG. 14  FIG. 15
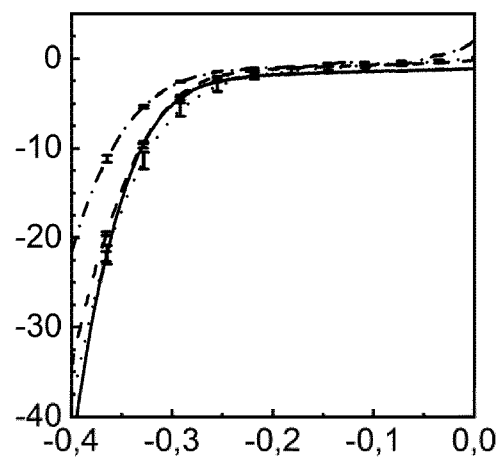
FIG. 16

USE OF SULFIDIC COMPOSITIONS

The present invention relates to the use of a sulfidic composition for the electrocatalytic water splitting.

BACKGROUND OF THE INVENTION

Hydrogen is mainly produced from natural gas via steam methane reforming. Further fossil sources are other hydrocarbons and coal (see e.g. John A. Turner, Sustainable Hydrogen Production, Science 2004, Vol 305, 972-974). Sustainable starting materials for hydrogen production are biomass or water. With water as starting material there are different production processes e.g. electrolysis, thermolysis and photoelectrolysis. There are two different types of electrolyzers at moderate temperature: alkaline and proton exchange membrane (PEM) electrolyzers (see e.g. Jamie D. Holladay, An overview of hydrogen production technologies, Catalysis Today 2009, 139, 244-260).

In commercial PEM electrolyzers platinum is used as electrocatalyst for the hydrogen evolution reaction (HER) (see e.g. Peter C. K. Vesborg, Recent Development in Hydrogen Evolution Reaction Catalysts and Their Practical Implementation, The Journal of Physical Chemistry Letters 2015, 6, 951-957).

For example, EP 3222752 A1 describes a method of generating hydrogen and oxygen from water, the method comprising, providing a membrane electrode assembly comprising an electrolyzer anode catalyst capable of catalyzing the oxygen evolution reaction at potentials greater than +1.23 Volt with respect to the reversible hydrogen electrode, the electrolyzer anode catalyst comprising nanostructured whiskers having thereon multiple alternating layers comprising respectively in any order Pt and Ir, the membrane electrode assembly further comprising a cathode; providing water in contact with the electrolyzer anode catalyst; and providing an electrical potential with sufficient current across the membrane electrode assembly to convert at least a portion of the water to hydrogen and oxygen on the cathode and anode respectively.

Efforts have already been made to provide platinum-free electrocatalysts for the HER. Especially metal sulfides, metal carbides, metal selenides, metal nitrides and metal phosphides show interesting properties for this reaction (see e.g. Xiaoxin Zou, Noble metal-free hydrogen evolution catalysts for water splitting, Chem. Soc. Rev. 2015, 44, 5148-5180).

WO 2017/062736 A1 describes structured molybdenum disulfide materials for electrocatalytic applications.

WO 2018/098451 A1 discloses catalysts including transition metal chalcogenide films for the hydrogen evolution reaction.

US 2015/0259810 A1 claims a device comprising a hydrogen evolution reaction catalyst.

The catalyst includes at least one component selected from the group consisting of transition metal phosphides, first row transition metal sulfides and transition metal arsenides as nanoparticles and especially CoP.

CN 105132941 A claims a molybdenum diselenide/carbon black composite hydrogen evolution electrocatalysis material and preparation method thereof.

WO 2015/021019 A1 claims a catalyst for promoting a hydrogen evolution reaction, the catalyst comprising a metal nitride having a formula: $M'_xM''_yN_z$ wherein M' is selected from the group consisting of Ag, Al, Ca, Co, Cr, Cu, Fe, Ga, In, Li, Mg, Mn, Na, Ni, Sc, Ti, V, Y and Zn and mixtures thereof, wherein M'' is selected from the group consisting of Hf, Mo, Nb, Re, Ru, Ta, W and Zr and mixtures thereof, wherein x is a number from 0 to 1; wherein y is a number from 1 to 2; wherein z is a number greater than 1.8 and less than 2.2; and wherein the metal nitride comprises a hexagonal lattice with a four-layered stacking sequence that comprises two formula units of mixed close packed structure with alternating layers of M'' metals in trigonal prismatic coordination and M' or M' and M'' metals in octahedral coordination.

EP 2377971 A1 describes electrocatalysts for the reduction of protons to form $H_2$ consisting of amorphous transition metal sulfide films or solids having activity at all pH values. Further $MoS_2$ and $WS_2$ are mentioned as possible transition metal sulfides.

Iron-nickel-pentlandite has been found as interesting composition for the HER (see Konkena et al., "Pentlandite rocks as sustainable and stable efficient electrocatalysts for hydrogen generation", Nature Communication 2016, 7, Article number 12269).

Klein et al. ((Table A2) "Chemical composition of Pentlandite of ODP holes 209-1268A, 209-1270D, 209-1271B and 209-1274A"; 2010), Schröcke et al. ("Mineralogie: Ein Lehrbuch Auf Systematischer Grundlage", page 137, 1981), Mineral Data Publishing ("Pentlandite", 2001) and Rajamani et al. ("Crystal Chemistry of Natural Pentlandites", Canadian Mineralogist, Vol. 12, page 178-187, 1973) disclose naturally occurring pentlandites.

Knop et al. ("Chalcogenides of the Transition Elements", Can. J. Chem., Vol. 39, 1961) discloses synthetically produced FeCoNiS-pentlandites.

Objective and Summary of the Present Invention

The compositions for electrocatalytic water splitting disclosed in the state-of-the-art do not fulfill all the requirements of catalytic performance, resistance against sulfur compounds, stability of catalytic activity and/or start-stop properties. Therefore, the aim of the present invention is to provide a novel use of a composition for the HER which has higher current density, has better resistance against sulfur compounds and has better start-stop properties compared to the state-of-the-art materials.

In one aspect the present invention provides the use of a composition of formula $$Fe_{9-a-b-c}Ni_aCo_bM_cS_{8-d}Se_d \qquad \text{I}$$

wherein

M stands for one or more elements, having in the ionic state an effective ionic radius in the range of 70-92 pm, a is a number within the range of $2.5 \leq a \leq 3.5$, more preferably $2.7 \leq a \leq 3.3$ b is a number within the range of $1.5 \leq b \leq 5.0$, more preferably $1.5 \leq b \leq 4.0$, most preferably $2.5 \leq b \leq 3.5$ c is a number within the range of $0.0 \leq c \leq 2.0$, more preferably $0.0 \leq c \leq 1.0$ d is a number within the range of $0.0 \leq d \leq 4.0$, more preferably $0.0 \leq d \leq 1.0$, wherein the sum of a, b and c is in the range of $5 \leq a+b+c \leq 8$ and wherein $\geq 90$ wt. of the composition is in the pentlandite phase for electrocatalytic splitting of water, preferably for hydrogen evolution reaction.

SHORT DESCRIPTION OF THE DRAWINGS

FIG. 7 shows the Powder X-ray (diffraction patterns, (Cu—Kα radiation)) of compositions used according to the present invention and comparative examples.

FIG. 14 shows controlled potential coulometry in the presence and absence of the catalyst poison $H_2S$ measured at 20° C. at −350 mV vs RHE over the course of 20 h.

FIG. 15 shows linear sweep voltammograms performed in the presence and absence of the catalyst poison $H_2S$ measured at 20° C. at −350 mV vs RHE before and after 20 h electrolysis.

FIG. 16 shows linear sweep voltammograms performed in the presence and absence of the catalyst poison $H_2S$ measured at 20° C. at −350 mV vs RHE before and after 20 h electrolysis.

DETAILED DESCRIPTION OF THE INVENTION

Figure 1A:
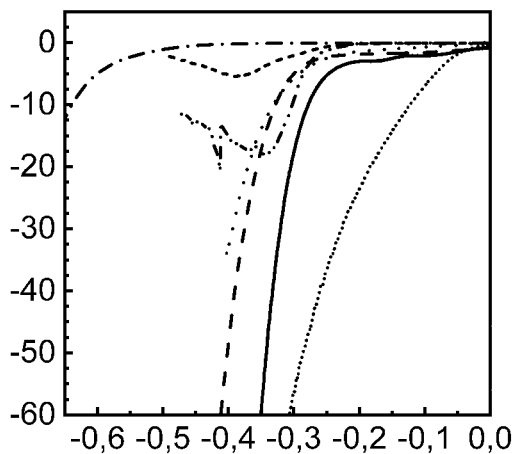
FIG. 1 shows linear sweep voltammograms obtained in a scan range of 0 to −0.65 V vs RHE in 0.5 M sulfuric acid at room temperature.

It was surprisingly found that through introduction of Co to a Fe,Ni-pentlandite the compositions used according to the present invention show a lower overpotential for the HER compared to the state-of-the-art pentlandite or other Platinum Group Metals (PGM)-free materials. It was also found that additional metals having an effective ionic radius comparable to those of $Fe^{2+}$, $Ni^{2+}$ or $Co^{2+}$ can be added to the composition. Further it was surprisingly found that although $Se^{2-}$ possesses a different ionic radius in comparison to $S^{2-}$ (198 pm vs 184 pm) it is possible to replace up to 50% of S with Se without losing the molecular structural integrity of the pentlandite phase, electrocatalytic activity or stability.

The effective ionic radius of metal ions can be determined according to the method described in Hollemann, Wieberg, Lehrbuch der Anorganischen Chemie, Verlag: De Gruyter; 102th edition (2007).

Compositions used according to the present invention show higher current densities than platinum-based materials after several hours of electrolysis and do not lose significant activity during hydrogen production. Also, electrodes produced with compositions used according to the present invention have significant better start/stop behaviours as compared with platinum electrodes. Finally, the compositions used according to the present invention are stable against sulfur poisoning.

The crystalline phase of unmodified pentlandite is e.g. described in A. Pearson, M. Buerger, Am. Mineral. 1956, 41, 804-805. In the composition used according to the present invention≥90 wt. % of the composition is in the pentlandite phase.

In one embodiment of the present invention, M is not present in a composition of formula I.

In this embodiment, the composition may be selected from the group consisting of
$Fe_3Ni_3Co_3S_8$
$Fe_1Co_5Ni_3S_8$
$Fe_2Co_4Ni_3S_8$
$Fe_4Co_2Ni_3S_8$
$Fe_3Ni_3Co_3S_4Se_4$
$Fe_3Ni_3Co_3S_7Se$
and mixtures thereof.

In another embodiment of the present invention, M is present in the composition of formula I.

M preferably has an effective ionic radius comparable to those of $Fe^{2+}$, $Ni^{2+}$ or $Co^{2+}$.

Especially, M may be selected from the group consisting of Nb, Cu, Mn or Cr and mixtures thereof, more preferably Mn and Cr and mixtures thereof, most preferably Cr.

Especially, the composition may be selected from the group consisting of $CrFe_{2.5}Co_{2.5}Ni_3S_8$
$MnFe_{2.5}Co_{2.5}Ni_3S_8$
$Mn_{0.25}Fe_{2.875}Co_{2.875}Ni_3S_8$
$NbFe_{2.5}Co_{2.5}Ni_3S_8$
and mixtures thereof.

A composition used according to the present invention is preferably characterized by showing an overpotential for a hydrogen evolution reaction (HER) of 328 mV and less, preferably 300 mV and less, at a current density of −10 $mA/cm^2$, in particular according to the test conditions set out below in detail.

In a further aspect an electrode, comprising a composition used according to the present invention, is provided.

The electrode according to the present invention is characterized by showing an overpotential for a hydrogen evolution reaction (HER) of 328 mV and less, preferably 300 mV and less at a current density of −10 $mA/cm^2$, in particular according to the test conditions set out below in detail.

In a further aspect, the present invention provides different processes for the preparation of a composition used according to the present invention. A first process (in the following: process #1) is characterized in that the compositions are synthesized in a thermal synthesis under exclusion of oxygen in vacuum. A second process (process #2) is characterized in that the compositions are synthesized in a thermal synthesis under exclusion of oxygen under inert gas. For selenium-free compositions used according to the present invention two further processes are suitable. One of these processes is characterized in that the compositions are synthesized via a co-precipitation method and an aftertreatment step (process #3). The other process (process #4) is characterized in that the compositions are synthesized via a sol-gel method and an aftertreatment step.

The thermal synthesis under exclusion of oxygen for the preparation of the compositions used according to the present invention is a method in analogy to the thermal synthesis route described in Piontek et al. ACS Catalysis 2018, 8, 987-996.

More particularly the thermal synthesis under exclusion of oxygen in vacuum (process #1) comprises the following steps:
a) Preparing a homogeneous mixture of Fe-powder, Ni-powder, Co-powder, S-powder and optionally Se-powder and/or M-powder by mixing or grinding. The average particle size of the final mixture is preferably below 100 µm.
b) Transferring the mixture obtained in step a) into a closed vessel, and evacuation to a vacuum in a range of 30 mbar-$10^{-15}$ mbar, preferably 1 mbar-$10^{-7}$ mbar.
c) Heating up the closed vessel by a rate of 0.1-20 K $min^{-1}$ in a temperature range of 600-1100° C., and holding for 1-120 h, preferably 700-1100° C. for 1-10 h with a rate of 2-5 K $min^{-1}$, more preferably with two holding temperatures, the first temperature of 600-800° C. for 3-10 h and a second temperature of 900-1100° C. for 10-20 h with a rate of 2-5 K $min^{-1}$, most preferably with two holding temperatures, the first temperature 700° C. for 3 h and a second temperature of 1000° C. for 10 h.

More particularly the thermal synthesis under exclusion of oxygen under inert gas (process #2) comprises the following steps:
a) Preparing a homogeneous mixture of Fe-powder, Ni-powder, Co-powder, S-powder and optionally Se-powder and/or M-powder by mixing or grinding. The average particle size of the final mixture has to be below 100 µm.
b) Transferring the mixture obtained in step a) to a closed vessel and substitute the air by an inert gas.
The inert gas can be nitrogen, carbon dioxide, neon, argon, krypton, xenon or a mixture thereof, preferably nitrogen, carbon dioxide and argon, more preferably nitrogen and argon, most preferably nitrogen.
c) Heating up the closed vessels by a rate of 0.1-20 K $min^{-1}$ in a temperature range of 600-1100° C., and holding for 1-120 h, preferably 700-1100° C. for 1-10 h with a rate of 2-5 K $min^{-1}$, more preferably with two holding temperature, the first temperature of 600-800° C. for 3-10 h and a second temperature of 900-1100° C. for 10-20 h with a rate of 2-5 K $min^{-1}$, most preferably with two holding temperature, the first temperature 700° C. for 3 h and a second temperature of 1000° C. for 10 h.

More particularly the co-precipitation method with an aftertreatment step (process #3) comprises the following steps:
a) Preparing a solution of iron salt, nickel salt, cobalt salt and optionally one or more salts of M defined in a compound of formula I and optionally an inorganic acid in water,
b) addition of one or more sulfide sources in water, optionally with an inorganic base, over the course of 1 to 120 min, preferably 10 to 60 min.
c) Filtration and washing with water of the precipitate,
d) drying in a temperature range of 60-120° C., for 1-120 h, preferably 80-100° C. for 3-15 h, or optionally freeze drying
e) Heating up the precipitate in a temperature range of 200-500° C. by a rate of 0.1-20 K $min^{-1}$, for 1-120 h, preferably 250-400° C. for 2-10 h by a rate of 2-5 K $min^{-1}$, under an atmosphere of hydrogen and hydrogensulfide,
f) and optionally heating the sample for 0.5-20 h, preferably 2-5 h under an atmosphere of hydrogen, optionally diluted with an inert gas, e.g. $N_2$ or Ar.

In this process an appropriate salt of iron, nickel, cobalt and M includes e.g. nitrates, oxides, hydroxides, carbonates, sulfates, acetates, halogenides and mixtures thereof, preferably nitrates, sulfates and acetates and mixtures thereof, most preferably nitrates.

In this process an inorganic acid in step a) includes appropriate inorganic acids, e.g. nitric acid, sulfuric acid, hydrochloric acid and mixtures thereof, preferably nitric acid and sulfuric acid and mixtures thereof, most preferably nitric acid.

In this process an appropriate source of sulfide includes salts of sulfide, e.g. sodium sulfide, sodium hydrogen sulfide, ammonium sulfide, ammoniumhydrogen sulfide, potassium sulfide, potassium hydrogen sulfide and hydrogen sulfide, preferably sodium sulfide, hydrogen sulfide and ammonium sulfide, more preferably sodium sulfide and ammoniumsulfide, most preferably sodium sulfide.

In this process an inorganic base in step b) includes an appropriate inorganic base, e.g. sodium hydroxide, sodium oxide, ammonia, potassium oxide, potassium hydroxide, preferably sodium hydroxide, sodium oxide and ammonia, more preferably sodium hydroxide and ammonia, most preferably sodium hydroxide.

The mixture of hydrogen and hydrogensulfide can be in the ratio from 95:5 to 0:100, preferably 90:10 to 50:50, more preferably 90:10 to 80:20, for example 85:15. This mixture can be diluted with an inert gas, e.g. argon, nitrogen.

The sol-gel method with an aftertreatment step (process #4) comprises the following steps:
a) Preparing a solution of iron salt, nickel salt, cobalt salt and optionally one or more salts of M defined in a compound of formula I and one or more polymer precursors and optionally one or more complexing agent in water.
b) Optionally adding an inorganic acid to the solution obtained in step a).
c) Heating the solution at 90° C. for 1-120 h until the formation of a viscous gel.
d) Calcination of the gel in a temperature range of 300-700° C., for 1-120 h, preferably 400-500° C. for 2-20 h in air.
e) Heating up the mixed oxide in a temperature range of 200-500° C., for 1-120 h, preferably 250-400° C. for 2-10 h, under an atmosphere of hydrogen and hydrogensulfide.
f) And optionally heating the sample for 0.5-20 h, preferably 2-5 h under an atmosphere of hydrogen, optionally diluted with an inert gas, e.g. $N_2$ or Ar.

In this process the complexing agent may also serve as a polymer precursor.

In this process an appropriate polymer precursor comprises polycarboxylic acids, hydroxyl-carboxylic acids, polyhydric alcohols and mixtures thereof, preferably polyhydric alcohols and polycarboxylic acids and mixtures thereof, more preferably polycarboxylic acids, most preferably citric acid.

In this process an appropriate complexing agent comprises organic compounds, e.g. organic acids, ketones aldehydes, alcohols, amines and mixtures thereof, preferably polycarboxylic acids, more preferably citric acid and oxalic acid and most preferably citric acid.

In this process, an appropriate salt of iron, nickel, cobalt and M includes salts of these elements, e.g. nitrates, oxides, hydroxides, carbonates, sulfates, acetates, halogenides and mixtures thereof, preferably nitrates, sulfates and acetates and mixtures thereof, most preferably nitrates.

In this process an inorganic acid in step a) includes appropriate inorganic acids, e.g. nitric acid, sulfuric acid, hydrochloric acid and mixtures thereof, preferably nitric acid and sulfuric acid and mixtures thereof, most preferably nitric acid.

EXAMPLES

Example 1—According to Process #1

$Fe_3Co_3Ni_3S_8$

Iron powder (0.43 g, Sigma-Aldrich, ≥99 wt. %), cobalt powder (0.46 g, ABCR, 99.8 wt. %), nickel powder (0.45 g, ABCR, 99.9 wt. %) and sulfur (0.66 g, Sigma-Aldrich, 99.5 wt. %-100.5 wt. %) were mixed together for 10 min until a visually homogenous mixture of the elements was obtained. The homogenous mixture of the elements was filled into a quartz ampule (10 mm diameter, total volume: 15 mL) that was evacuated at a pressure below $4 \times 10^{-2}$ mbar for 16 h and was then sealed under vacuum. The sample was placed in an oven and heated to 700° C. with a heating rate of 4.5 K $\min^{-1}$. After holding the temperature isotherm for 3 h to let the sulfur react with the metal mixture without damaging the vessel, the temperature was raised to 1000° C. (heating rate 3.33 K $\min^{-1}$) to increase the diffusion. Then, the sample was kept at this temperature for 10 hours. Afterwards the sample was allowed to cool to room temperature.

Example 2-10

Similar to the process described in Example 1, the following compositions were synthesized:

TABLE 1a

| | | M is not present | | | | |
|---|---|---|---|---|---|---|
| Example | Composition | Iron [g] | Cobalt [g] | Nickel [g] | Sulfur [g] | Selenium [g] |
| Example 2 | $Fe_1Co_5Ni_3S_8$ | 0.14 | 0.75 | 0.45 | 0.66 | — |
| Example 3 | $Fe_2Co_4Ni_3S_8$ | 0.29 | 0.60 | 0.45 | 0.66 | — |
| Example 4 | $Fe_4Co_2Ni_3S_8$ | 0.58 | 0.30 | 0.46 | 0.66 | — |
| Example 5 | $Fe_3Co_3Ni_3S_7Se$ | 0.35 | 0.37 | 0.37 | 0.27 | 0.65 |
| Example 6 | $Fe_3Co_3Ni_3S_4Se_4$ | 0.41 | 0.43 | 0.43 | 0.54 | 0.19 |
| Supplier | | Sigma-Aldrich | ABCR | ABCR | Sigma-Aldrich | ACROS Organics |
| Purity/[wt. %] | | ≥99 | 99.8 | 99.9 | 99.5-100.5 | +99.5 |

TABLE 1b

| | | M is present | | | | | | |
|---|---|---|---|---|---|---|---|---|
| Example | Composition | Chromium [g] | Manganese [g] | Niobium [g] | Iron [g] | Cobalt [g] | Nickel [g] | Sulfur [g] |
| Example 7 | $CrFe_{2.5}Co_{2.5}Ni_3S_8$ | 0.13 | — | — | 0.36 | 0.38 | 0.46 | 0.67 |
| Example 8 | $MnFe_{2.5}Co_{2.5}Ni_3S_8$ | — | 0.14 | — | 0.36 | 0.38 | 0.45 | 0.66 |
| Example 9 | $Mn_{0.25}Fe_{2.875}Co_{2.875}Ni_3S_8$ | — | 0.04 | — | 0.41 | 0.44 | 0.45 | 0.66 |
| Example 10 | $NbFe_{2.5}Co_{2.5}Ni_3S_8$ | — | — | 0.23 | 0.34 | 0.36 | 0.43 | 0.63 |
| Supplier | | Riedel-de-Haen | Riedel-de-Haen | Alfa-Aesar | Sigma-Aldrich | ABCR | ABCR | Sigma-Aldrich |
| Purity/[wt. %] | | 99-98% | >99% | 99.99% | ≥99 | 99.8 | 99.9 | 99.5-100.5 |

Example 11 (According to Process #2)

Fe$_3$CO$_3$Ni$_3$S$_8$

Iron powder (0.43 g, Sigma-Aldrich, ≥99 wt. %), cobalt powder (0.46 g, ABCR, 99.8 wt. %), nickel powder (0.45 g, ABCR, 99.9 wt. %) and sulfur (0.66 g, Sigma-Aldrich, 99.5 wt. %-100.5 wt. %) were mixed together for 10 min until a visually homogenous mixture of the elements was obtained. The homogenous mixture of the elements was filled into a quartz ampule (10 mm diameter, total volume: 15 mL) that was evacuated at a pressure below 4×10$^{-2}$ mbar, filled with argon and then sealed under a static argon atmosphere. The sample was placed in an oven and heated to 700° C. with a heating rate of 4.5 K min-1. After holding the temperature isotherm for 3 h, the temperature was raised to 1000° C. (heating rate 3.33 K min-1). Then, the sample was kept at this temperature for 10 h. Afterwards, the sample was allowed to cool to room temperature.

Example 12 (According to Process #3)

Fe$_3$Co$_3$Ni$_3$S$_8$

Iron(III)-nitrate (Fe(NO$_3$)$_3$·9H$_2$O, 1.35 g), nickel(II)-nitrate (Ni(NO$_3$)$_2$·6H$_2$O, 0.97 g) and cobalt(II)-nitrate (Co(NO$_3$)$_2$·6H$_2$O, 0.97 g) were dissolved in 300 mL water. In a separate container, sodium sulfide (Na$_2$S·9H$_2$O, 4.80 g) was dissolved in 200 mL water. The sulfide solution was added to the nitrate solution within 30 min under vigorous stirring leading to the formation of a black precipitate. The black precipitate was filtered off and washed with 200 mL water. The residue was then freeze-dried. In a N$_2$ stream, the black powder was then heated to 40° C. (10 K min$^{-1}$) and kept at this temperature for 10 min. Subsequently, the temperature was increased to 300° C. (10 K min$^{-1}$) applying a hydrogen (85 vol. %)/hydrogen sulfide (15 vol. %) stream. After 4 h at such conditions, pure hydrogen gas was applied to the sample for consecutive 4 h. The reaction was rapidly stopped by applying a cold (25° C.) gas stream of nitrogen. Throughout the experiment the gas flow was regulated to 40 mL min$^{-1}$ and kept constant.

Example 13 (According to Process #3)

Fe$_3$Co$_3$Ni$_3$S$_8$

Iron(III)-nitrate (Fe(NO$_3$)$_3$·9H$_2$O, 1.35 g), nickel(II)-nitrate (Ni(NO3)$_2$·6H$_2$O, 0.97 g) and cobalt(II)-nitrate (Co(NO$_3$)$_2$·6H$_2$O, 0.97 g) were dissolved in 300 mL water. In a separate container, ammonium sulfide ((NH$_4$)$_2$S (20 wt. % in H$_2$O), 20 mmol, 6.81 g) was dissolved in 200 mL water. The sulfide solution was added to the nitrate solution within 30 min under vigorous stirring leading to the formation of a black precipitate. The black precipitate was filtered off and washed with 200 mL water. The residue was then freeze-dried. In a N$_2$ stream, the black powder is then heated to 40° C. (10 K min$^{-1}$) and kept at this temperature for 10 min. Subsequently, the temperature was increased to 300° C. (10 K min$^{-1}$) applying a hydrogen (85 vol. %)/hydrogen sulfide (15 vol. %) stream. After 4 h at such conditions, pure hydrogen gas was applied to the sample for consecutive 4 h. The reaction was rapidly stopped by applying a cold (25° C.) gas stream of nitrogen. Throughout the experiment the gas flow was regulated to 40 mL min$^{-1}$ and kept constant.

Example 14 (According to Process #4)

Fe$_3$Co$_3$Ni$_3$S$_8$

Iron(II)-nitrate (Fe(NO$_3$)$_3$·9H$_2$O, 2.02 g), cobalt(II)-nitrate (Co(NO$_3$)$_2$·6H$_2$O, 1.46 g) and nickel(II)-nitrate (Ni(NO$_3$)$_2$·6H$_2$O, 1.45 g) were dissolved in 15 mL water containing 2.88 g citric acid. The solution was heated to 90° C. for 2-6 h leading to the formation of a viscous gel. The obtained gel was calcinated at 500° C. for 18 h and the obtained black solid was filled into a quartz glass holder which was placed in an oven. The oven was then purged with an inert gas (N$_2$) for 10 min at 40° C. Then the gas flow was changed to a mixture of hydrogen (85 vol. %) and hydrogensulfide (15 vol. %) and the temperature was raised to 300° C. with a heating rate of 10 K min$^{-1}$. After 15 min purging the sample with hydrogen (85 vol. %) and hydrogen sulfide (15 vol. %) at 300° C., pure hydrogen was purged through the apparatus at 300° C. for 4 h. Subsequently, the oven was switched off and the sample was rapidly cooled down in a cold (25° C.) N$_2$ stream. Throughout the experiment the gas flow was regulated to 40 mL min$^{-1}$ and kept constant.

Comparative Example 1

Fe$_{4.5}$Ni$_{4.5}$S$_8$ (Piontek et al. ACS Catalysis 2018, 8, 987-996)

Iron metal powder (1.75 g, Sigma-Aldrich, ≥99 wt. %), nickel (1.75 g, ABCR, 99.9 wt. %) and sulfur (1.70 g, Sigma-Aldrich, 99.5 wt. %-100.5 wt. %) were mixed together for 10 min. until a visually homogenous mixture of the elements is obtained. This mixture was placed in a 10 mm quartz tube. Subsequently, the quartz tube was sealed under a static vacuum and was heated to 700° C. with 5° C. min$^{-1}$. After 3 h of annealing at 700° C., the temperature was raised to 1100° C. within 30 min. After 10 h at 1100° C., the mixture was allowed to cool down to room temperature.

Comparative Example 2

Co$_9$S$_8$

Cobalt powder (1.35 g, ABCR, 99.8 wt. %) and sulfur (0.66 g, Sigma-Aldrich, 99.5 wt. %-100.5 wt. %) were mixed together for 10 min until a visually homogenous mixture of the elements was obtained. The homogenous mixture of the elements was filled into a quartz ampule (10 mm diameter, total volume: 15 mL) that was evacuated at a pressure below 4×10$^{-2}$ mbar for 16 h and was then sealed under vacuum. The sample was placed in an oven and heated to 700° C. with a heating rate of 4.5 K min$^{-1}$. After holding the temperature isotherm for 3 h to let the sulfur react with the metal mixture without damaging the vessel, the temperature was raised to 1000° C. (heating rate 3.33 K min$^{-1}$) to increase the diffusion. Then, the sample was kept at this temperature for 10 h. Afterwards the sample was allowed to cool to room temperature.

Electrode Preparation for Example 1-10 as Well as Comparative Example 1-2

Custom-built Teflon casing with a brass rod was used as contact for electrodes (3 mm diameter). The respective material to be used for making the electrode (50 mg) was grinded to obtain a fine powder material. The ground powder was filled into a compressing tool (3 mm in diameter) and the ground powder was pressed with a maximum weight force of 800 kg/cm$^2$. A two-component silver-epoxide glue was applied on the brass rod in the cavity of the Teflon casing to connect the brass support with the electrode material. The pellet was then pressed into the Teflon casing and any pollution on the Teflon casing was removed. The contact between the brass rod and the pellet was tested with a voltmeter to assure proper conductivity. Subsequently, the electrode was stored at 60° C. for 12 h to allow for curing of the two-component glue. After cooling to room temperature, the electrode was polished with sandpaper (20 μm, 14 μm, 3 μm and 1 μm grit) to obtain a shiny flush flat surface within the Teflon case. After cleaning the surface with deionized water and drying under ambient conditions, the electrode could be used without further processing.

Comparative Example 3

$MoS_2$ Nanosheets

Bulk $MoS_2$ crystals were synthesized by chemical vapour transport method. In a typical synthesis, elemental powders of Mo and S were mixed in stoichiometric proportions (1:1) and inserted into a quartz tube. The quartz tube was evacuated to ~$10^{-6}$ mbar and sealed. The sealed quartz tube was placed in a tube furnace at 800° C. for 2 weeks to ensure the crystal formation. The quartz tube was cooled down to room temperature and opened for collecting the formed crystals.

These $MoS_2$ crystals were exfoliated by dispersing 5 mg/ml of the crystals in CTAB surfactant solution (2 mg/ml) in water, followed by a sonication for 10 h in a 100 W bath sonicator. After sonication, the dispersions were subjected to differential centrifugation to narrow down the size distribution. In a typical method, the dispersions were centrifuged at 1,000 rpm for 1 h. The supernatant was separated and subjected to successive centrifugation at 2,000 and 4,000 rpm for periods of 2 h each. The process was terminated at this stage (at 4,000 rpm). The sediment was collected and redispersed in water under sonication. After sonication the dispersion was stable for 3 months without any flocculation and used for further investigations. For the preparation of the electrode an aqueous suspension with a concentration of 5 g $MoS_2$ per liter was prepared, followed by ultra-sonication for 30 min. A volume of 5 ml of this suspension was drop-coated onto a polished glassy carbon electrode with a geometric area of 0.126 $cm^2$ and dried in air at room temperature. The modified electrodes were subjected to continuous potential cycling in the potential window of –0.5 to 0.5 V versus Ag/AgCl/3 M KCl until reproducible voltammograms were obtained.

Comparative Example 4

$NiS_2$ Nanosheets $NiS_2$ nanosheets were synthesized by a one-step hydrothermal method. In a typical method, 4 mmol of nickel chloride hexahydrate ($NiCl_2·6H_2O$) and 4 mmol of $Na_2S_2O_3·5H_2O$ were mixed in a beaker containing 30 ml of milliQ water and stirred for 1 h. The mixed solution was transferred to a 60 ml Teflon-lined stainless-steel autoclave and heated for 24 h at 180° C. The precipitate was collected by centrifugation and repeatedly washed with ethanol and water (1:2) mixture, and then dried. For the preparation of the electrode an aqueous suspension with a concentration of 5 g $MoS_2$ per liter was prepared, followed by ultra-sonication for 30 min. A volume of 5 ml of this suspension was drop-coated onto a polished glassy carbon electrode with a geometric area of 0.126 $cm^2$ and dried in air at room temperature. The modified electrodes were subjected to continuous potential cycling in the potential window of –0.5 to 0.5 V versus Ag/AgCl/3 M KCl until reproducible voltammograms were obtained.

Comparative Example 5

$FeS_2$ Nanosheets $FeS_2$ nanosheets were synthesized by a one-step hydrothermal method. In a typical method, 4 mmol of ferric chloride tetrahydrate ($FeCl_2·4H_2O$) and 4 mmol of $Na_2S_2O_3·5H_2O$ were mixed in a beaker containing 30 ml of milliQ water and stirred for 1 h. The mixed solution was transferred to a 60 ml Teflon-lined stainless-steel autoclave and heated for 24 h at 180° C. The precipitate was collected by centrifugation and repeatedly washed with ethanol and water (1:2) mixture, and then dried. For the preparation of the electrode an aqueous suspension with a concentration of 5 g $MoS_2$ per liter was prepared, followed by ultra-sonication for 30 min. A volume of 5 mL of this suspension was drop-coated onto a polished glassy carbon electrode with a geometric area of 0.126 $cm^2$ and dried in air at room temperature. The modified electrodes were subjected to continuous potential cycling in the potential window of –0.5 to 0.5 V versus Ag/AgCl/3 M KCl until reproducible voltammograms were obtained.

Comparative Example 6

Pt

A custom-built Teflon casing with a brass rod was used as contact for electrodes (3 mm diameter). 200 mg of a fine-mesh platinum net (99.99 wt. %) was grinded to obtain a fine powder material. The finely ground powder was filled into a compressing tool (3 mm in diameter) and the powder was pressed with a maximum weight force of 800 kg/$cm^2$. A two-component silver-epoxide glue was applied on the brass rod in the cavity of the Teflon casing to connect the brass support with the electrode material. The pellet was then pressed into the Teflon casing and any pollution on the Teflon casing was removed. The contact between the brass rod and the pellet was tested with a voltmeter to assure proper conductivity. Subsequently, the electrode was stored at 60° C. for 12 h to allow for curing of the two-component glue. After cooling to room temperature, the electrode was polished with sand paper (20 μm, 14 μm, 3 μm and 1 μm grit) to obtain a shiny flush flat surface within the Teflon case. The grid was cleaned in a first step with concentrated hydrochloric acid and afterwards with deionized water and dried under ambient conditions. The electrode could be used without further processing.

Conditions for Electrochemical Testing

For the electrochemical investigation of the catalyst materials the respective catalyst was pressed into pellets and built into custom-made electrodes comprising the following steps:

a) The catalyst material (50 mg) was ground to a fine powder material, filled into a custom-built compressing tool (3 mm in diameter) and then pressed with a maximum weight force of 800 kg/$cm^2$.

b) A custom-built Teflon casing was contacted with a brass rod as contact for electrodes (3 mm diameter). A silver-epoxide glue (Polytec EC 151 L) was applied on the brass rod in the cavity of the Teflon casing to connect the brass support with the electrode material.

c) The pellet was pressed into the Teflon casing and any pollution on the Teflon casing was removed.

d) The contact between the brass rod and the pellet was tested with a voltmeter (VOLTCRAFT VC840) to assure proper conductivity.

e) The electrode was stored at 60° C. for 12 h to allow for curing of the two-component glue.

f) The electrode was cooled to room temperature and polished with sand paper (20 µm, 14 µm, 3 µm and 1 µm grit, 3M Lapping Film Bogen 261X/262X) to obtain a shiny flush flat surface within the Teflon case. After cleaning the surface with deionized water (Millipore Milli-Q Academic Water Purification System) and drying under ambient conditions, the electrode could be used without further processing.

The experiments were accomplished with a standard three-electrode setup using the prepared electrode ($A_{geom.}$=0.071 cm$^2$) as working electrode, Ag/AgCl (saturated KCl or 3M KCl solution) electrode as reference electrode and Pt wire (1 mm diameter) or Pt-grid ($A_{geom.}$=1.25 cm$^2$) as counter electrode. A custom-built, gas-tight H-type cell was then equipped with a stirring bar and was filled with the electrolyte consisting of 0.5 M H$_2$SO$_4$ for all electrochemical experiments. The electrolyte was not exchanged during the electrochemical testing of an electrode. All potentials are referenced to $E_{RHE}$ (RHE=reversible hydrogen electrode) according to $E_{RHE}=E_{Ag/AgCl}+X+0.059$ pH wherein X=0.197 V (saturated KCl) or X=0.210 V (3 M KCl), unless noted otherwise. The used potentiostate was a Gamry Reference 600+ instrument.

Measurement of the Catalytic Performance

Electrocatalytic experiments were performed by the following steps:

a) The electrolyte (0.5 M H$_2$SO$_4$, 25 mL) was added to the electrochemical cell and the electrodes were adjusted to assure that the electrodes are fully immersed into solution.

b) Magnetic stirring (IKA Topolino) was switched on.

c) A cyclic voltammetry (CV) experiment was performed to obtain fast overview on the electrochemical processes that can be observed.

d) The CV experiment was repeated to allow for fast electrochemical surface purification in potential range from 0.2 to −0.2 V. Experiments were performed with a scan rate of 100 mV/s (non-catalytic potential area) and the number of cycles was set to 20. Before starting the experiment, the iR compensation value for the electrochemical setup was determined by using a GAMRY Reference 600 potentiostate and the built-in software routine. The potential range for the linear sweep voltammetry (LSV) experiments was set from −0.2 to −0.8 V vs RHE and the scan rate to 5 mV/s, including the iR drop into the experiment. The linear sweep experiments were repeated for at least three times to ensure reproducibility.

Stability Testing and Gas Analysis

To judge the stability of the materials according to the examples, the electrodes were kept at a constant potential (CPC experiments) for an extended period of time (at least 12 h). The electrodes were evaluated in 0.5 M H$_2$SO$_4$ at a constant potential of −0.71 V vs. RHE. In addition, gas samples were simultaneously collected from the headspace. For this purpose, the electrochemical cell was connected to a gas chromatograph (GC; Agilent system with JAS injection system) equipped with a thermal conductivity detector. The injection loop of the GC was continuously fed with the headspace from the electrolyzer. Argon (10-20 mL min$^{-1}$) was used as a carrier gas to purge the reactor and the GC injection loop. The hydrogen gas produced during the electrolysis was thus quantified and faraday efficiencies calculated, correlating the measured amount obtained from the flown charge during the CPC experiments with the maximum theoretically possible amount.

Start/Stop Behaviors

When dealing with renewable energy, the capability to start and stop the electrochemical process is of utmost importance. Thus, the start/stop properties of the pentlandite electrodes were examined. For this purpose, long-time experiments as reported above (see stability testing) with a lowered overpotential (−350 mV vs RHE or −304 mV vs RHE) were performed with defined interruptions (Table 2). Subsequently, the measurements were automatically restarted under identical conditions. The measurements on pentlandite electrodes were standardly compared with a platinum electrode of the same electrode diameter.

TABLE 2

Timings of Start/Stop-experiments

| Time [h] | Measurement |
|---|---|
| 0 | ongoing |
| 5 | paused |
| 7 | ongoing |
| 17 | paused |
| 22 | ongoing |
| 25 | paused |
| 28 | ongoing |
| 41 | paused |
| 44 | ongoing |
| 47 | paused |
| 49 | ongoing |
| 50 | paused |
| 51 | ongoing |
| 55 | paused |
| 57 | ongoing |
| 64 | paused |
| 67 | ongoing |
| 70 | paused |
| 71 | ongoing |
| 72 | finished |

Poisoning Experiments

Since poisoning by small molecules (e.g. H$_2$S) renders numerous catalysts inapplicable or require an elaborate purification of the starting materials, we investigated the applicability of pentlandites to act as stable electrocatalysts also in the presence of usual catalyst poisons. Thus, long-time experiments (see experimental procedure "Stability testing and gas analysis" above) were conducted in the presence of H$_2$S. For this purpose, the electrolyte was constantly purged with H$_2$S and the overall pressure was kept at 1.5 bar.

Characterization

The compositions used according to the present invention were characterized partly in terms of XRD, DSC, ICP-OES and SEM-EDX.

The scanning electron microscope (SEM) LEO (Zeiss) 1530 Gemini FESEM was operated at a voltage of 20 kV (SEM) and 4.4 kV (electron dispersive X-ray spectroscopy, EDX).

Powder X-ray diffraction (PXRD) was performed using a diffractometer from HUBER with Mo-Kα radiation (0.709 Å) and the Bruker Advance D8 with Cu—Kα radiation (0.154 Å) scanning in an angle range of 3-50° with a step size of 0.03°/s. All reflex positions were converted from Mo to Cu radiation via Bragg's law.

The Fe and Ni composition for all different samples were determined by inductively coupled plasma optical emission spectrometry (ICP-OES) with a Thermo Scientific iCAP 6500 Duo equipped with CETAC ASX 520 autosampler.

Data acquisition was carried out on iTEVA. Calibration curves were prepared in double deionized water (ddw) with 3 vol % nitric acid, in a range between 5000-100 ppb (6 points). Standards and samples were freshly prepared in ddw with 3 vol % metal free nitric acid. Readings were made in no-gas mode. Samples (1 mg) were diluted in 3 mL metal-free aqua regia, placed in 55 mL TFM vessels and digested in a CEM Mars Xpress microwave (160° C., 15 min ramp, 15 min hold). Digested mixtures were then diluted to 10 mL by addition of double deionized water.

The materials were investigated by differential scanning calorimetry (DSC) using a NETZSCH STA 449 F3 Jupiter. Approximately 50 mg of a sample were placed in a closed corundum crucible and processed from room temperature to 1000° C. and vice versa at 10 K min$^{-1}$ in a continuous N$_2$ gas flow.

The Electrochemical Cell

Figure 8:
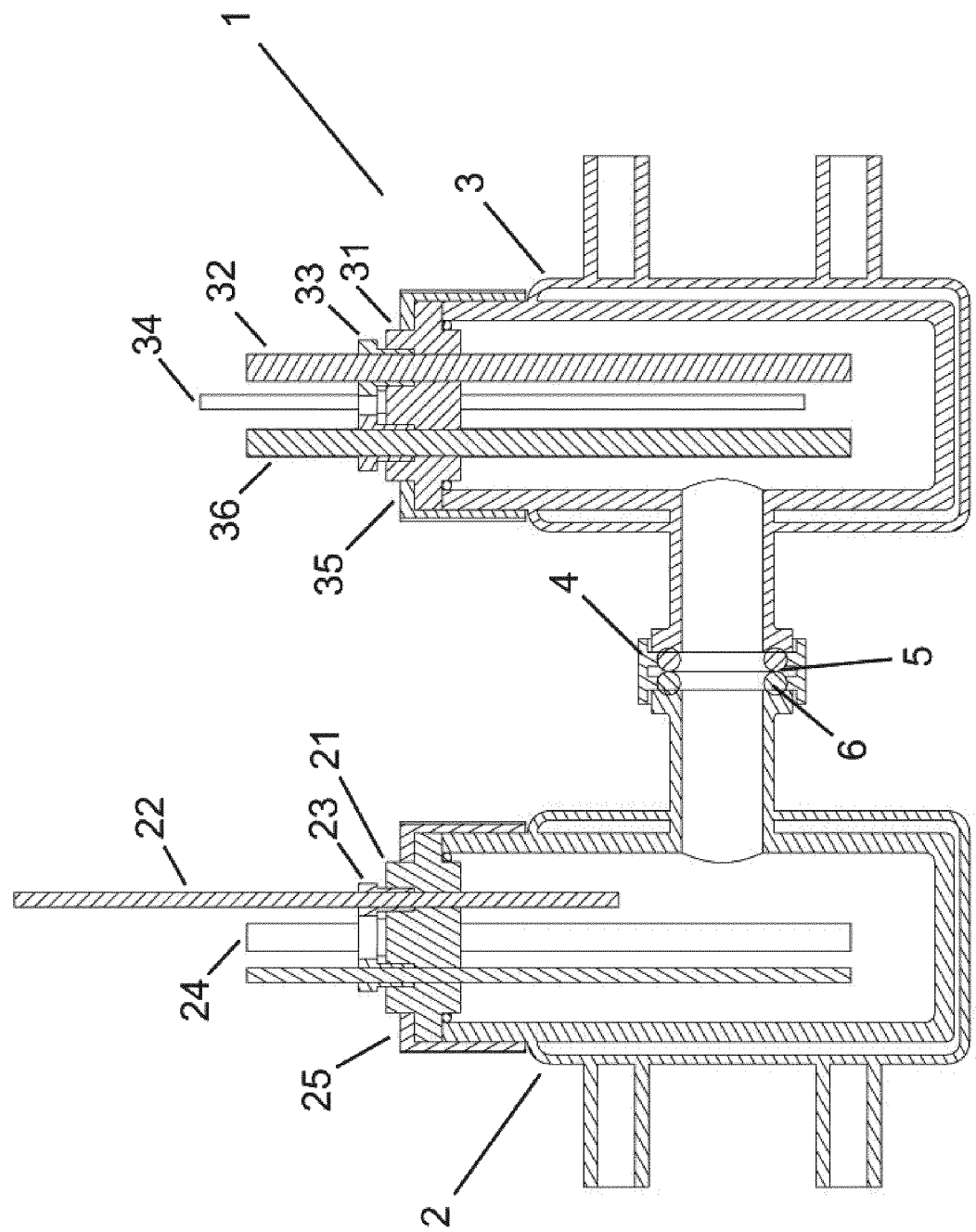
FIG. 8 shows a cross-sectional view of the electrochemical cell employed for the tests conducted with compositions used according to the present invention and comparative examples.

Most parts of the cell are custom-built if not otherwise stated and are explained in the following by way of reference to FIG. 8 which shows a cross-sectional view of the cell. The custom-built electrochemical cell 1 consists of two glass compartments 2, 3. The right compartment 3 holds the working electrode 32 and the reference electrode (36). The left compartment 2 holds the counter electrode 24. The cell 1 is equipped with a custom-built aluminum membrane holder 4 optionally wrapped in PTFE-band (generic sealing tape) connecting the parts. The membrane holder 4 fixates the membrane 5 (Fumatech FUMASEP F-10100) which divides the cathode from the anode space, with two rubber rings (18×5 mm) 6. The membrane holder 4 is placed between the glass flanges of the cell compartments 2, 3 and an aluminum holding device (neoLab KF16 3-point clamb) is holding everything in place. The compartments 2, 3 of the electrochemical cell 1 can be tempered by liquid recirculating chiller or heater. The custom-built electrode holder insets 21, 31 for the cell compartments are made from PEEK Polymer and have drilling holes, to place the electrodes 24, 32, 36 and the temperature sensor (optional) into the electrolyte. Custom-built PEEK screws 23, 33 and compression rings (not shown) are used to hold the electrodes 24, 32, 36 and optional temperature sensors in place. Additional drilling holes are made for optional gas flushing devices 22, 34. The cap insets are hold in place by GL45 SCHOTT Caps 25, 35 with cuttings (Duran connection systems).

Results

Overpotential

Table 3 summarizes the potentials measured with compositions used according to the invention and comparative examples. The negative values result from the fact that the potential was measured versus the reversible hydrogen electrode.

TABLE 3

| Sample | Composition | $E_{RHE}$ at −10 mA/cm$^2$ [mV] |
| --- | --- | --- |
| Example 1 | Fe$_3$Ni$_3$Co$_3$S$_8$ | −279 |
| Example 2 | Fe$_1$Co$_5$Ni$_3$S$_8$ | −328 |
| Example 3 | Fe$_2$Co$_4$Ni$_3$S$_8$ | −311 |
| Example 4 | Fe$_4$Co$_2$Ni$_3$S$_8$ | −278 |
| Example 5 | Fe$_3$Ni$_3$Co$_3$S$_4$Se$_4$ | −294 |
| Example 6 | Fe$_3$Ni$_3$Co$_3$S$_7$Se | −278 |
| Example 7 | CrFe$_{2.5}$Co$_{2.5}$Ni$_3$S$_8$ | −318 |
| Example 11 | Fe$_3$Ni$_3$Co$_3$S$_8$ | −277 |
| Example 12 | Fe$_3$Ni$_3$Co$_3$S$_8$ | −292 |
| Example 13 | Fe$_3$Ni$_3$Co$_3$S$_8$ | −292 |
| Example 14 | Fe$_3$Ni$_3$Co$_3$S$_8$ | −293 |
| Comparative Example 1 | Fe$_{4.5}$Ni$_{4.5}$S$_8$ | −328 |
| Comparative Example 2 | Co$_9$S$_8$ | −332 |
| Comparative Example 3 | MoS$_2$ | −625 |
| Comparative Example 4 | NiS$_2$ | −302 |
| Comparative Example 5 | FeS$_2$ | −386 at −6 mA/cm$^2$ * |
| Comparative Example 6 | Pt | −123 |

* higher current densities not achievable

Table 3 illustrates that compositions used according to the present invention show a higher overpotential compared to platinum-based catalysts, but surprisingly they predominantly show a lower overpotential for the HER compared to another state-of-the-art catalyst (Comparative Example 1).

FIGS. 1A to 1E are linear sweep voltammograms obtained in a scan range of 0 to −0.65 V vs RHE in 0.5 M sulfuric acid at room temperature. X-axis shows potential in V and Y-axis the current density in mA cm$^{-2}$.

FIG. 1A: Example 1 (solid), Comparative Example 1 (dashed), Comparative Example 2 (dotted), Comparative Example 3 (dash-dotted), Comparative Example 4 (dash-double dotted), Comparative Example 5 (short-dashed) and Comparative Example 6 (short-dotted).

Figure 1B:
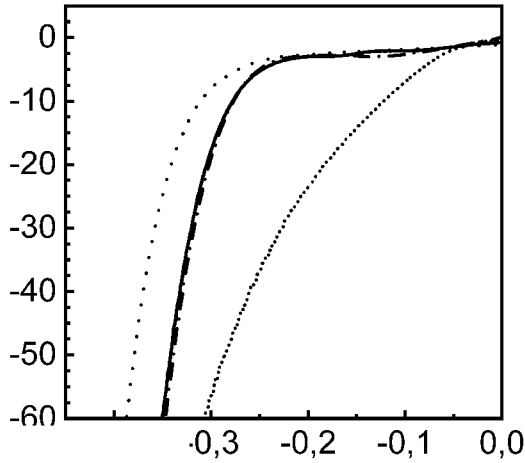

FIG. 1B: Example 1 (solid), Example 3 (dotted), Example 4 (dash-dotted) and Comparative Example 6 (short-dotted).

Figure 1C:
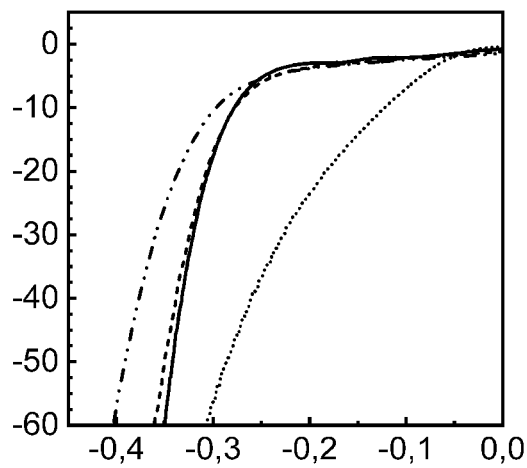

FIG. 1C: Example 1 (solid), Example 5 (dash-double dotted), Example 6 (short-dashed) and Comparative Example 6 (short-dotted).

Figure 1D:
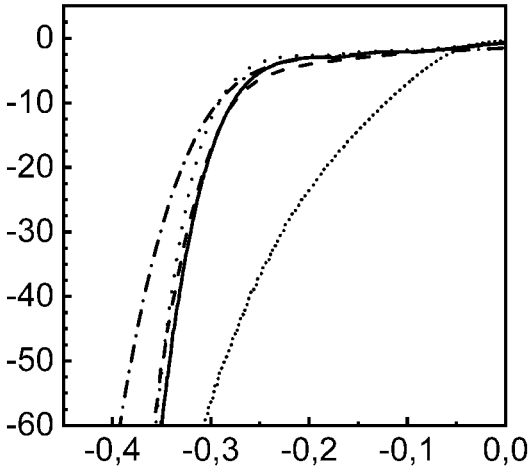

FIG. 1D: Example 1 (solid), Example 11 (dashed), Example 12/13 (dotted), Example 14 (dash-dotted) and Comparative Example 6 (short-dotted).

Figure 1E:
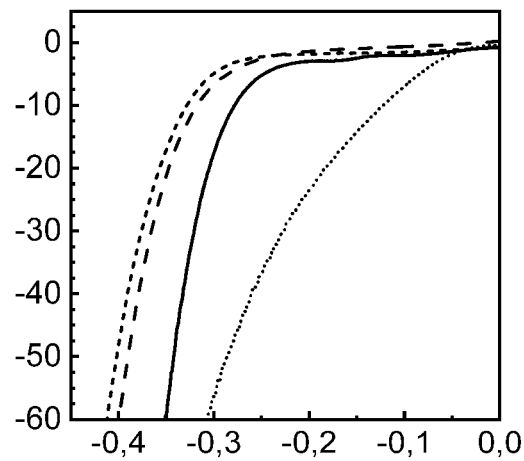

FIG. 1E: Example 1 (solid), Example 7 (dashed), Comparative Example 1 (short-dashed) and Comparative Example 6 (short-dotted).

Current Densities after Several Hours of Electrolysis

Compositions used according to the present invention show higher overpotential for the HER compared to platinum-based catalysts but surprisingly they show higher current densities than platinum-based materials after several hours of electrolysis. With higher current densities it is possible to produce a higher amount of hydrogen with a quantitative Faraday efficiency. Therefore, an industrial hydrogen production employing these compositions is more efficient and cheaper than with commercial catalysts.

Figure 2:
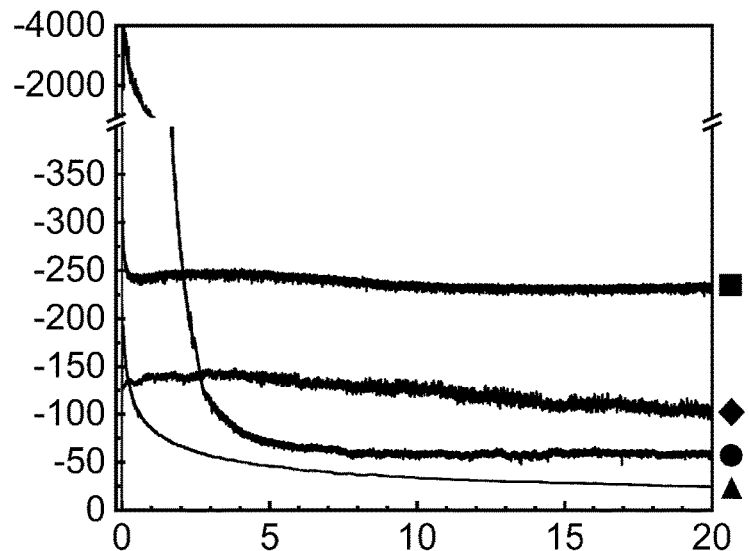
FIG. 2 shows the results of controlled potential coulometry measurements at −0.5 V vs RHE at 20° C. and 60° C. for Pt (Comparative Example 6) and $Fe_3Co_3Ni_3S$ electrodes (Example 1) for 20 h.

FIG. 2 shows the results of controlled potential coulometry measurements at −0.5 V vs RHE at 20° C. and 60° C. for Pt (Comparative Example 6) and Fe$_3$Co$_3$Ni$_3$S$_8$ electrodes (Example 1) for 20 h. Curves of Example 1 at 20° C. (check) and at 60° C. (square), as well as Comparative Example 6 at 20° C. (triangle) and 60° C. (circle) are shown.

The X-axis shows time in hours and Y-axis the current density in mA cm$^{-2}$.

Activity Level During Hydrogen Production

State-of-the-art materials lose a lot of activity during usage compared to their fresh status. Surprisingly electrodes produced with compositions used according to the present invention lose no significant activity during hydrogen production, as evidenced in FIG. 3.

FIG. 3 shows linear sweep voltammograms performed at 20° C. (A) and 60° C. (B) before and after 20 h electrolysis for platinum (Comparative Example 6) and Fe$_3$Co$_3$Ni$_3$S$_8$ (Example 1).

Figure 3A:
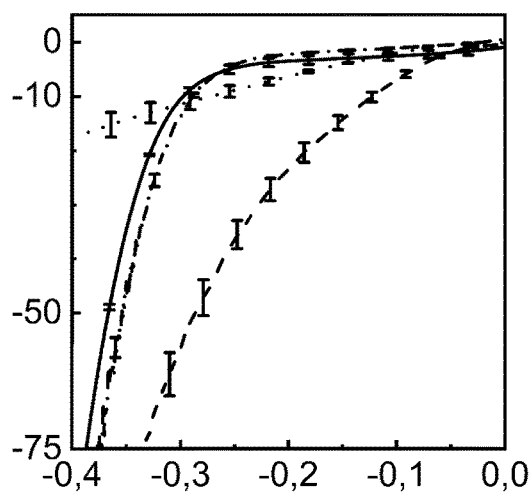
FIG. 3 shows linear sweep voltammograms performed at 20° C. (A) and 60° C. (B) before and after 20 h electrolysis for platinum (Comparative Example 6) and $Fe_3Co_3Ni_3S$ (Example 1).

FIG. 3A: Example 1 before (solid) and after (dash-dotted) and Comparative Example 6 before (dashed) and after (dotted) electrolysis at 20° C.

Figure 3B:
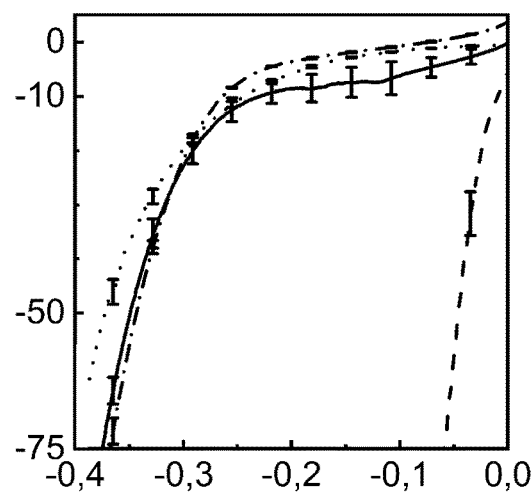

FIG. 3B: Example 1 before (solid) and after (dash-dotted) and Comparative Example 6 before (dashed) and after (dotted) electrolysis at 60° C.

The X-axis in each case shows potential in V and Y-axis the current density in mA cm$^{-2}$.

Start/Stop behavior

Start Stop Behavior—Compared to Comparative Example 6

Figure 4:
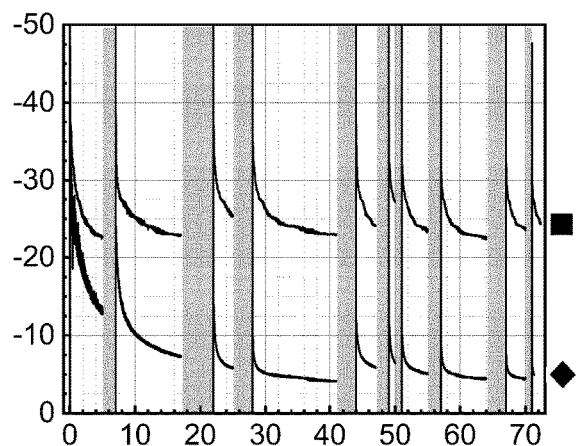
FIG. 4 shows controlled potential coulometry in start-and-stop mode measured at 60° C. at −304 mV vs RHE over the course of 72 h for $Fe_3Co_3Ni_3S_8$(Example 1) and platinum (Comparative Example 6).

Astonishingly, electrodes produced with compositions used according to the present invention have significant better Start/Stop behaviors than platinum electrodes, as evidenced by FIGS. 4 and 9. While the current density of platinum decreases to less than 20% of its initial current density, the compositions used according to the present invention can retain a significant higher amount of their initial current densities. With these improved Start/Stop behaviors it is possible to make full use of renewable energy peaks (as e.g. wind or photovoltaic) for a sustainable hydrogen production.

FIG. 4 shows controlled potential coulometry in start-and-stop mode measured at 60° C. at −304 mV vs RHE over the course of 72 h for $Fe_3Co_3Ni_3S_8$ (Example 1, square) and platinum (Comparative Example 6, check).

The X-axis shows time in hours and Y-axis the current density in mA cm$^2$.

Figure 9A:
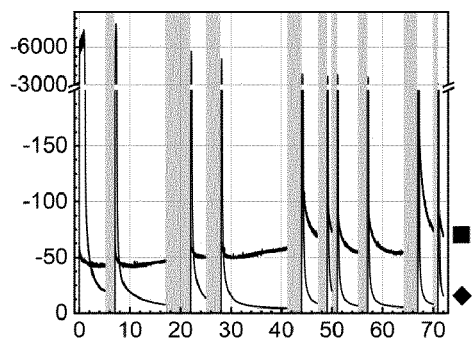
FIG. 9 shows controlled potential coulometry in start-and-stop mode measured at 60° C. at −350 mV vs RHE over the course of 72 h.

FIG. 9A as well shows controlled potential coulometry in start-and-stop mode for $Fe_3Co_3Ni_3S_8$ (Example 1, square) and platinum (Comparative Example 6, check) however, measured at 60° C. at −350 mV vs RHE over the course of 72 h. The current densities of Example 1 and Comparative Example 6 in FIG. 4 are lower compared to the obtained current densities of the same catalysts in FIG. 9A. These differences are originating from the lower potential applied in the measurement of FIG. 4 (−304 mV) compared to FIGS. 9A to 9E (−350 mV). Nevertheless, both figures (FIGS. 4 and 9A) show that Example 1 is superior to Comparative Example 6 regarding the Start/Stop behavior.

FIGS. 9B to 9E show controlled potential coulometry in start-and-stop mode measured at 60° C. at −350 mV vs RHE over the course of 72 h. As measured with the same set of parameters, the results shown in FIGS. 9A and 9B to 9E can be compared to each other.

Figure 9B:
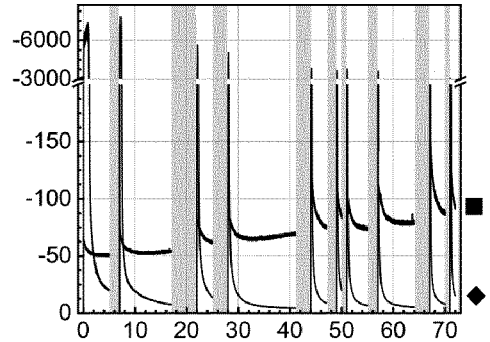

FIG. 9B: Example 2 (square) and Comparative Example 6 (check).

Figure 9C:
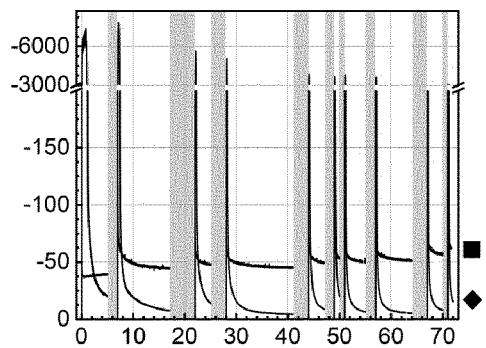

FIG. 9C: Example 4 (square) and Comparative Example 6 (check).

Figure 9D:
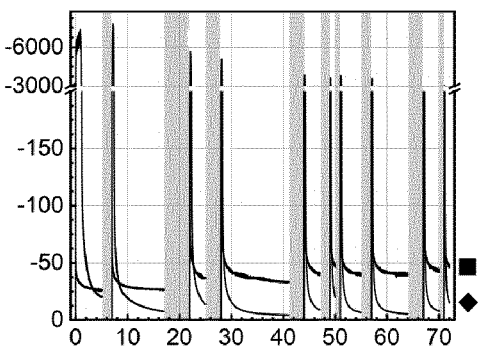

FIG. 9D: Example 6 (square) and Comparative Example 6 (check).

Figure 9E:
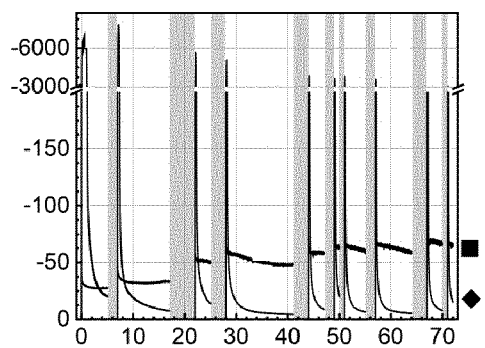

FIG. 9E: Example 7 (square) and Comparative Example 6 (check).

The X-axis shows time in hours and Y-axis the current density in mA cm$^{-2}$.

Start Stop Behavior—Compared to Comparative Example 1

Astonishingly, electrodes produced with compositions used according to the present invention also have similar or even better Start/Stop behaviors than another state-of-the-art electrode composition, namely $Fe_{4.5}Ni_{4.5}S_8$ (Comparative Example 1), as evidenced by FIG. 17. The compositions used according to the present invention can retain the same or even a higher amount of their initial current densities compared to the composition of Comparative Example 1, particularly upon several rounds of Start/Stop. With these improved Start/Stop behaviors it is possible to make full use of renewable energy peaks (as e.g. wind or photovoltaic) for a sustainable hydrogen production.

FIGS. 17A to 17D shows controlled potential coulometry in start-and-stop mode measured at 60° C. at −350 mV vs RHE over the course of 72 h.

Figure 17A:
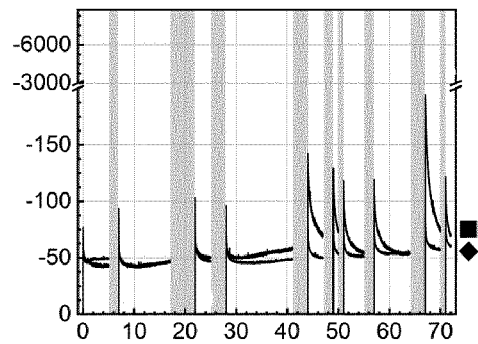
FIG. 17 shows controlled potential coulometry in start-and-stop mode measured at 60° C. at −350 mV vs RHE over the course of 72 h.

FIG. 17A: Example 1 (square) and Comparative Example 1 (check).

Figure 17B:
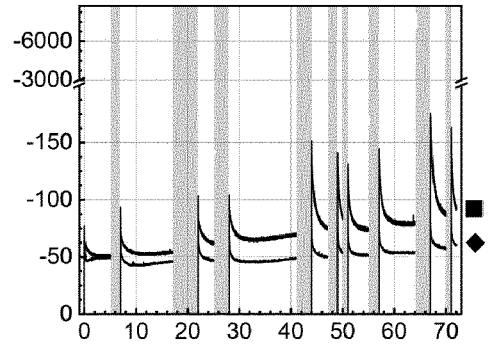

FIG. 17B: Example 2 (square) and Comparative Example 1 (check).

Figure 17C:
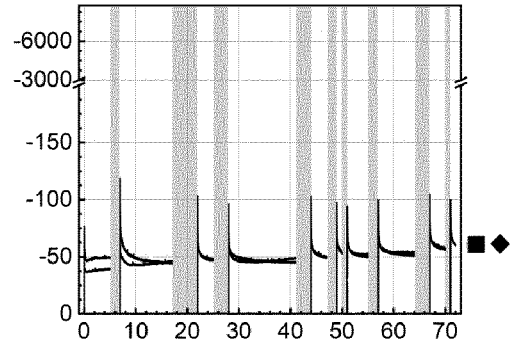

FIG. 17C: Example 4 (square) and Comparative Example 1 (check).

Figure 17D:
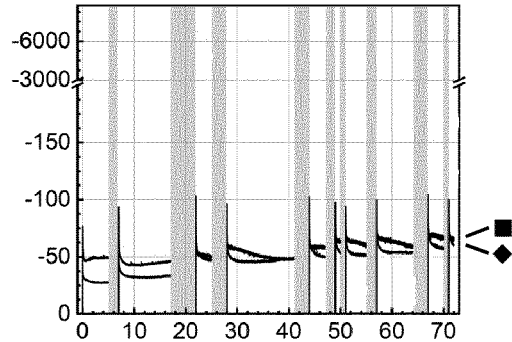

FIG. 17D: Example 7 (square) and Comparative Example 1 (check).

The X-axis shows time in hours and Y-axis the current density in mA cm$^{-2}$.

Stability Against Sulfur Poisoning

Stability Against Sulfur Poisoning—Compared to Comparative Example 6

A further advantage of the compositions used according to the present invention is the stability against sulfur poisoning (FIGS. 5, 6 and 10 to 16). While platinum is very sensitive against sulfur compounds and loses activity, the compositions used according to the present invention show almost the same or even a higher (e.g. FIGS. 10 and 12) activity upon the treatment with sulfur compounds. A further effect of sulfur compounds is that the poisoning of platinum electrodes is an irreversible effect, while sulfur compounds have a reversible effect on compositions used according the present invention. Therefore, very pure water as starting materials is necessary for PEM-electrolysers with platinum as electrocatalyst for the HER, while with compositions used according to the present innovation it is possible to use various different water sources.

FIGS. 5, 10, 12 and 14 show controlled potential coulometry in the presence and absence of the catalyst poison $H_2S$ measured at 20° C. at −350 mV vs RHE over the course of 20 h.

Figure 5:
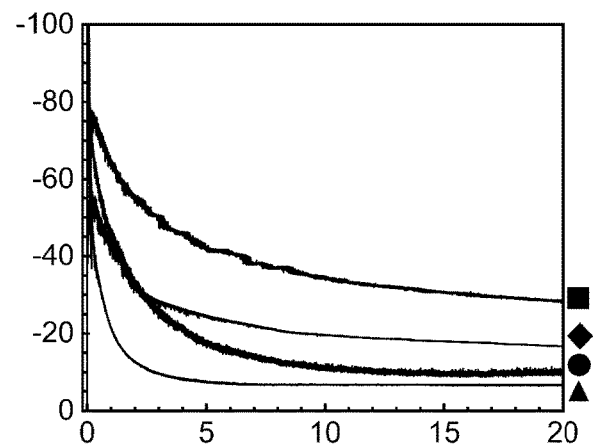
FIG. 5 shows controlled potential coulometry in the presence and absence of the catalyst poison $H_2S$ measured at 20° C. at −350 mV vs RHE over the course of 20 h.

FIG. 5: Curves of Example 1 without (square) and within (check) the presence of $H_2S$, as well as Comparative Example 6 without (circle) and within (triangle) the presence of $H_2S$.

Figure 10:
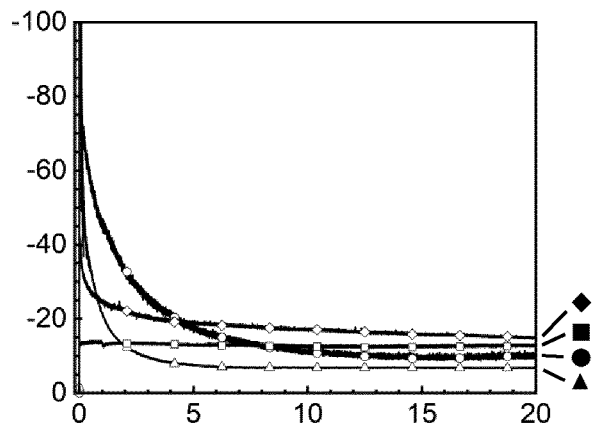
FIG. 10 shows controlled potential coulometry in the presence and absence of the catalyst poison $H_2S$ measured at 20° C. at −350 mV vs RHE over the course of 20 h.

FIG. 10: Curves of Example 2 without (square) and within (check) the presence of $H_2S$, as well as Comparative Example 6 without (circle) and within (triangle) the presence of $H_2S$.

Figure 12:
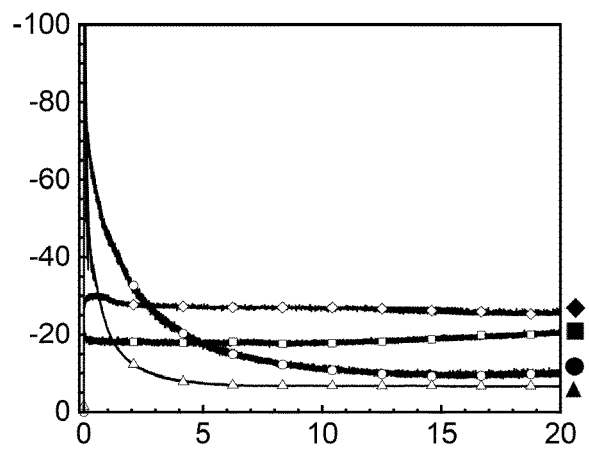
FIG. 12 shows controlled potential coulometry in the presence and absence of the catalyst poison $H_2S$ measured at 20° C. at −350 mV vs RHE over the course of 20 h.

FIG. 12: Curves of Example 4 without (square) and within (check) the presence of $H_2S$, as well as Comparative Example 6 without (circle) and within (triangle) the presence of $H_2S$.

FIG. 14: Curves of Example 6 without (square) and within (check) the presence of $H_2S$, as well as Comparative Example 6 without (circle) and within (triangle) the presence of $H_2S$.

The X-axis shows time in hours and Y-axis the current density in mA cm$^{-2}$.

FIGS. 6, 11, 13, 15 and 16 show linear sweep voltammograms performed in the presence and absence of the catalyst poison $H_2S$ measured at 20° C. at −350 mV vs RHE before and after 20 h electrolysis.

Figure 6A:
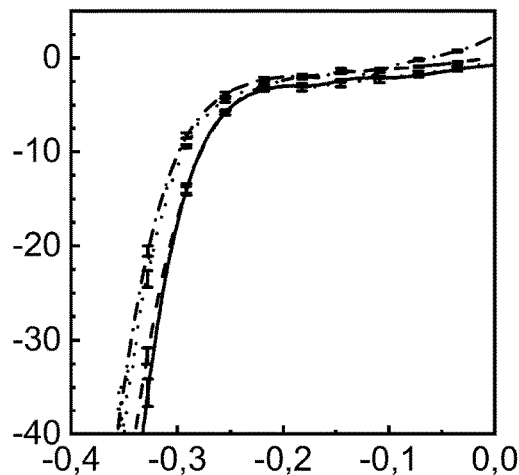
FIG. 6 shows linear sweep voltammograms performed in the presence and absence of the catalyst poison $H_2S$ measured at 20° C. at −350 mV vs RHE before and after 20 h electrolysis.

FIG. 6A: Curves of Example 1 in absence of $H_2S$ before (solid) and after (dashed) electrolysis, next to curves of Example 1 in presence of $H_2S$ before (dotted) and after (dash-dotted) electrolysis.

Figure 6B:
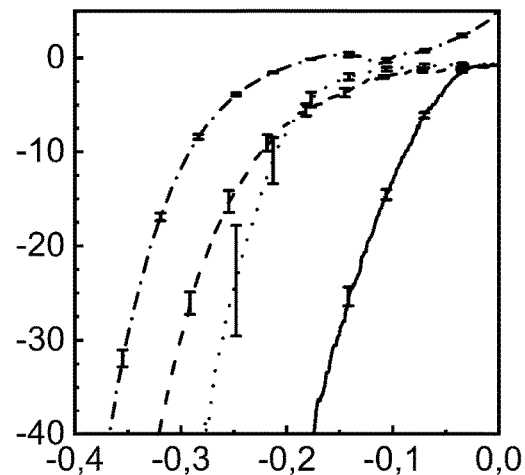

FIG. 6B: Curves of Comparative Example 6 in absence of $H_2S$ before (solid) and after (dashed) electrolysis, next to curves of Comparative Example 6 in presence of $H_2S$ before (dotted) and after (dash-dotted) electrolysis.

Figure 11:
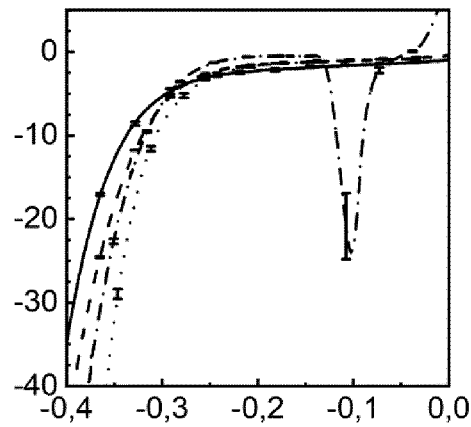
FIG. 11 shows linear sweep voltammograms performed in the presence and absence of the catalyst poison $H_2S$ measured at 20° C. at −350 mV vs RHE before and after 20 h electrolysis.

FIG. 11: Curves of Example 2 in absence of H$_2$S before (solid) and after (dashed) electrolysis, next to curves of Example 2 in presence of H$_2$S before (dotted) and after (dash-dotted) electrolysis.

Figure 13:
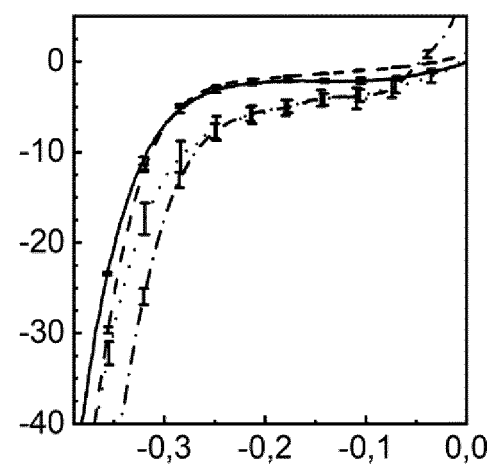
FIG. 13 shows linear sweep voltammograms performed in the presence and absence of the catalyst poison $H_2S$ measured at 20° C. at −350 mV vs RHE before and after 20 h electrolysis.

FIG. 13: Curves of Example 4 in absence of H$_2$S before (solid) and after (dashed) electrolysis, next to curves of Example 4 in presence of H$_2$S before (dotted) and after (dash-dotted) electrolysis.

FIG. 15: Curves of Example 6 in absence of H$_2$S before (solid) and after (dashed) electrolysis, next to curves of Example 6 in presence of H$_2$S before (dotted) and after (dash-dotted) electrolysis.

FIG. 16: Curves of Example 7 in absence of H$_2$S before (solid) and after (dashed) electrolysis, next to curves of Example 7 in presence of H$_2$S before (dotted) and after (dash-dotted) electrolysis.

The X-axis in each case shows potential in V and Y-axis the current density in mA cm$^{-2}$.

Stability Against Sulfur Poisoning—Compared to Comparative Example 1

The stability against sulfur poisoning of the compositions used according to the present invention is further compared to another state of the art electrode composition, namely Fe$_{4.5}$Ni$_{4.5}$S$_8$ (Comparative Example 1) (FIGS. 18 to 25). The compositions used according to the present invention show a comparable or even better activity upon the treatment with sulfur compounds compared to the Comparative Example 1.

Figure 18:
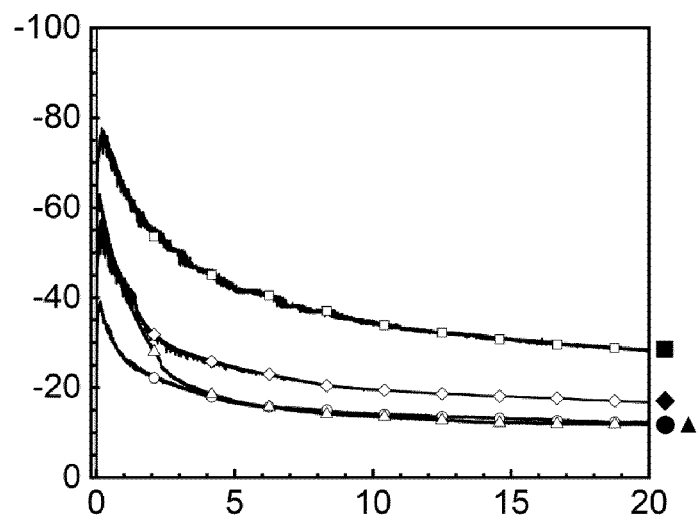
FIG. 18 shows controlled potential coulometry in the presence and absence of the catalyst poison $H_2S$ measured at 20° C. at −350 mV vs RHE over the course of 20 h.
Figure 20:
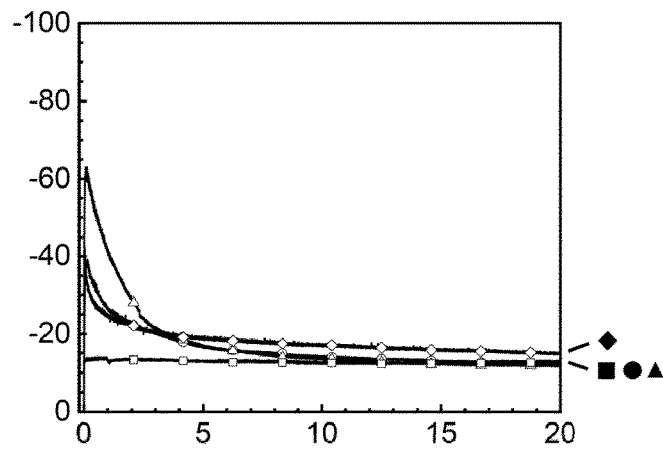
FIG. 20 shows controlled potential coulometry in the presence and absence of the catalyst poison $H_2S$ measured at 20° C. at −350 mV vs RHE over the course of 20 h.
Figure 22:
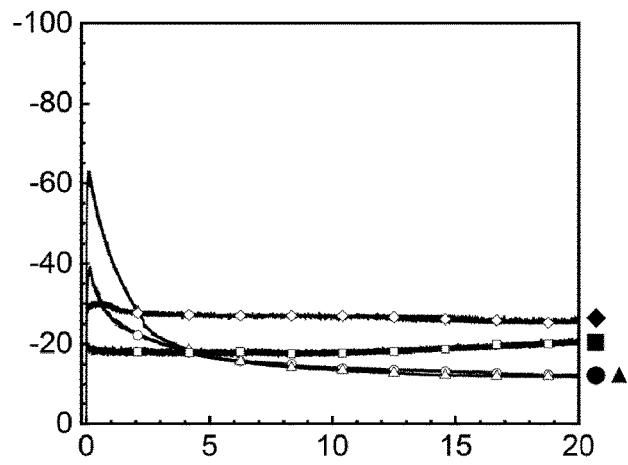
FIG. 22 shows controlled potential coulometry in the presence and absence of the catalyst poison $H_2S$ measured at 20° C. at −350 mV vs RHE over the course of 20 h.

FIGS. 18, 20 and 22 show controlled potential coulometry in the presence and absence of the catalyst poison H$_2$S measured at 20° C. at −350 mV vs RHE over the course of 20 h.

FIG. 18: Curves of Example 1 without (square) and within (check) the presence of H$_2$S, as well as Comparative Example 1 without (circle) and within (triangle) the presence of H$_2$S.

FIG. 20: Curves of Example 2 without (square) and within (check) the presence of H$_2$S, as well as Comparative Example 1 without (circle) and within (triangle) the presence of H$_2$S.

FIG. 22: Curves of Example 4 without (square) and within (check) the presence of H$_2$S, as well as Comparative Example 1 without (circle) and within (triangle) the presence of H$_2$S.

The X-axis shows time in hours and Y-axis the current density in mA cm$^{-2}$.

FIGS. 19, 21, 23, 24 and 25 show linear sweep voltammograms performed in the presence and absence of the catalyst poison H$_2$S measured at 20° C. at −350 mV vs RHE before and after 20 h electrolysis.

Figure 19A:
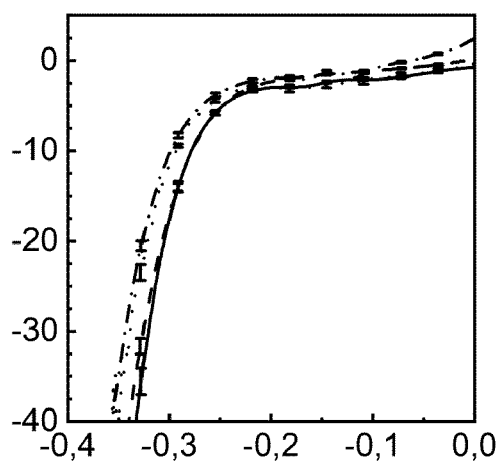
FIG. 19 shows linear sweep voltammograms performed in the presence and absence of the catalyst poison $H_2S$ measured at 20° C. at −350 mV vs RHE before and after 20 h electrolysis.

FIG. 19A: Curves of Example 1 in absence of H$_2$S before (solid) and after (dashed) electrolysis, next to curves of Example 1 in presence of H$_2$S before (dotted) and after (dash-dotted) electrolysis.

Figure 19B:
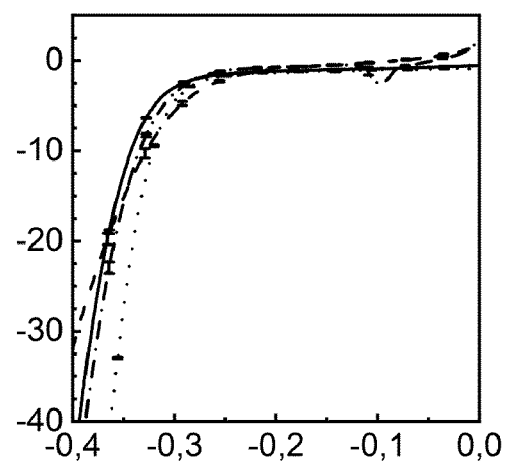

FIG. 19B: Curves of Comparative Example 1 in absence of H$_2$S before (solid) and after (dashed) electrolysis, next to curves of Comparative Example 1 in presence of H$_2$S before (dotted) and after (dash-dotted) electrolysis.

Figure 21:
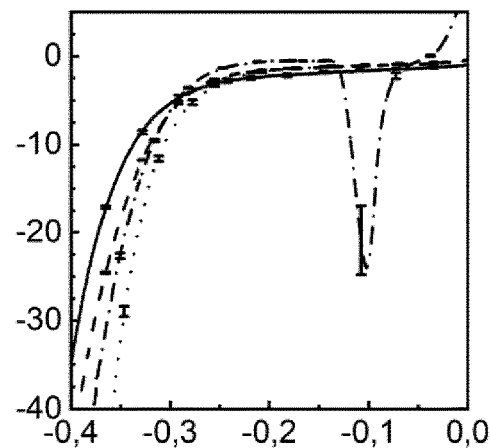
FIG. 21 shows linear sweep voltammograms performed in the presence and absence of the catalyst poison $H_2S$ measured at 20° C. at −350 mV vs RHE before and after 20 h electrolysis.

FIG. 21: Curves of Example 2 in absence of H$_2$S before (solid) and after (dashed) electrolysis, next to curves of Example 2 in presence of H$_2$S before (dotted) and after (dash-dotted) electrolysis.

Figure 23:
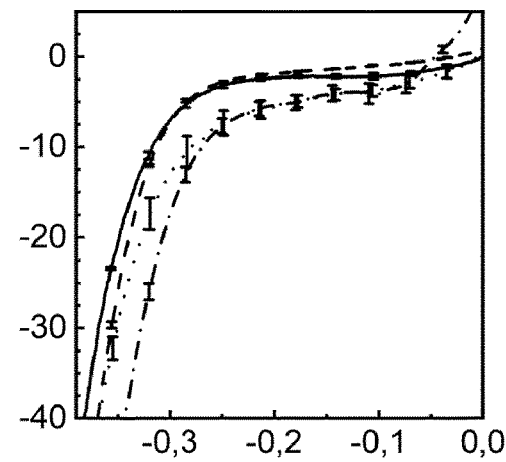
FIG. 23 shows linear sweep voltammograms performed in the presence and absence of the catalyst poison $H_2S$ measured at 20° C. at −350 mV vs RHE before and after 20 h electrolysis.

FIG. 23: Curves of Example 4 in absence of H$_2$S before (solid) and after (dashed) electrolysis, next to curves of Example 4 in presence of H$_2$S before (dotted) and after (dash-dotted) electrolysis.

Figure 24:
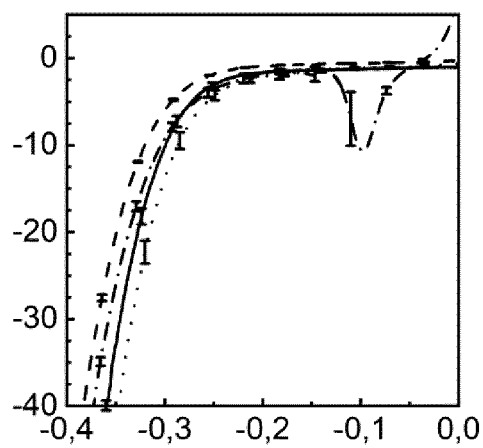
FIG. 24 shows linear sweep voltammograms performed in the presence and absence of the catalyst poison $H_2S$ measured at 20° C. at −350 mV vs RHE before and after 20 h electrolysis.

FIG. 24: Curves of Example 6 in absence of H$_2$S before (solid) and after (dashed) electrolysis, next to curves of Example 6 in presence of H$_2$S before (dotted) and after (dash-dotted) electrolysis.

Figure 25:
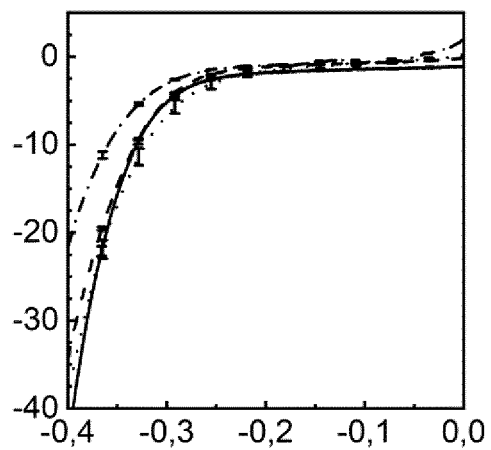
FIG. 25 shows linear sweep voltammograms performed in the presence and absence of the catalyst poison $H_2S$ measured at 20° C. at −350 mV vs RHE before and after 20 h electrolysis.

FIG. 25: Curves of Example 7 in absence of H$_2$S before (solid) and after (dashed) electrolysis, next to curves of Example 7 in presence of H$_2$S before (dotted) and after (dash-dotted) electrolysis.

The X-axis in each case shows potential in V and Y-axis the current density in mA cm$^{-2}$.

Powder X-Ray (Diffraction Patterns)

FIG. 7 shows the Powder X-ray (diffraction patterns, (Cu—Kα radiation)) of compositions used according to the present invention and comparative examples.

FIG. 7A: Patterns of Example 1 (square), Comparative Example 1 (triangle), Comparative Example 2 (circle), Comparative Example 3 (check), Comparative Example 4 (empty square) and Comparative Example 5 (empty circle).

FIG. 7B: Example 1 (square), Example 3 (circle) und Example 4 (check).

FIG. 7C: Example 1 (square), Example 5 (triangle) and Example 6 (circle).

FIG. 7D: Example 1 (square), Example 11 (triangle), Example 12/13 (circle) and Example 14 (check).

FIG. 7E: Example 1 (square) and Example 7 (triangle).

The X-Axis in each case shows the angles 2Θ in ° and the Y-Axis the dimensionless intensity.

It is apparent from FIG. 7A that compositions used according to the present invention (such as Example 1, square) show XRD-pattern very similar to unmodified pentlandite (Comparative example 1, triangle).

It is surprising that the compositions used according to the present invention operate in a broad pH area of 0-14 when elevated potentials are applied, whereas other sulfide compositions with iron, cobalt or nickel are not stable in such a broad pH area. Pentlandite as the crystalline phase seems to be the reason for this high stability.

Compositions used according to the present invention are useful alone or in combination with an electrically conductive support material (e.g. graphene) as electrocatalyst for the hydrogen evolution reaction in PEM electrolyser.

A composition used according to the present invention may be also useful for hydrogen production in the alkaline water electrolysis or high pressure electrolysers.

The invention claimed is:

1. A composition of formula I:

$$Fe_{9-a-b-c}Ni_aCo_bM_cS_{8-d}Se_d \quad (I)$$

wherein,
M stands for one or more elements having in the ionic state an effective ionic radius in the range of 70-92 pm,
a is a number within the range of 2.5≤a≤3.5,
b is a number within the range of 1.5≤b≤5.0,
c is a number within the range of 0.0≤c≤2.0,
d is a number within the range of 0.0≤d≤4.0,
the sum of a, b and c is in the range of 5≤a+b+c≤8,
≥90 wt. % of the composition is in the pentlandite phase, and
the composition is configured for electrocatalytic splitting of water.

2. The composition according to claim 1, wherein M is omitted.

3. The composition according to claim 2, wherein the composition is selected from the group consisting of Fe$_3$Ni$_3$Co$_3$S$_8$, Fe$_1$Co$_5$Ni$_3$S$_8$, Fe$_2$Co$_4$Ni$_3$S$_8$, Fe$_4$Co$_2$Ni$_3$S$_8$, Fe$_3$Ni$_3$CO$_3$S$_4$Se$_4$, Fe$_3$Ni$_3$Co$_3$S$_7$Se, and mixtures thereof.

4. The composition according to claim 1, wherein M is present.

5. The composition according to claim 4, wherein M is selected from the group consisting of Nb, Cu, Mn, Cr, and mixtures thereof.

6. The composition according to claim 5, wherein the composition is selected from the group consisting of $CrFe_{2.5}Co_{2.5}Ni_3S_8$, $MnFe_{2.5}Co_{2.5}Ni_3S_8$, $Mn_{0.25}Fe_{2.875}CO_{2.875}Ni_3S_8$, $NbFe_{2.5}CO_{2.5}Ni_{13}S_8$, and mixtures thereof.

7. The composition according to claim 1, wherein the composition shows an overpotential for a hydrogen evolution reaction (HER) of 328 mV and less, at a current density of −10 mA/cm².

8. An electrode, comprising a composition of formula I as defined in claim 1.

9. An electrode according to claim 8, wherein the electrode shows an overpotential for a hydrogen evolution reaction (HER) of 328 mV and less at a current density of −10 mA/cm².

10. The composition according to claim 5, wherein M is selected from the group consisting of Mn, Cr, and mixtures thereof.

11. The composition according to claim 10, wherein M is Cr.

12. The composition according to claim 7, wherein the composition shows an overpotential for a hydrogen evolution reaction (HER) of 300 mV and less at a current density of −10 mA/cm².

13. A composition of formula I:

$$Fe_{9-a-b-c}Ni_aCo_bM_cS_{8-d}Se_d \qquad (I)$$

wherein,
M stands for one or more elements having in the ionic state an effective ionic radius in the range of 70-92 pm,
a is a number within the range of 2.7≤a≤3.3,
b is a number within the range of 1.5≤b≤4.0,
c is a number within the range of 0.0≤c≤1.0
d is a number within the range of 0.0≤d≤1.0,
the sum of a, b and c is in the range of 5≤a+b+c≤8
≥90 wt. % of the composition is in the pentlandite phase,
wherein the composition is configured for electrocatalytic splitting of water.

14. The composition according to claim 13, wherein b is a number within the range of 2.5≤b≤3.5.

15. The composition according to claim 13, wherein the composition shows an overpotential for a hydrogen evolution reaction (HER) of 328 mV and less at a current density of −10 mA/cm².

16. An electrode, comprising a composition of formula I as defined in claim 13.

17. An electrode according to claim 16, wherein the electrode shows an overpotential for a hydrogen evolution reaction (HER) of 328 mV and less at a current density of −10 mA/cm².

18. A method of electrocatalytic splitting of water, comprising:
placing an electrode comprising the composition of claim 1 in an electrochemical cell containing an electrolyte solution comprising water and an electrolyte;
applying a potential to the electrode; and
the potential causing electrocatalytic splitting of the water.

19. The method according to claim 18, the electrocatalytic splitting of the water resulting in hydrogen evolution.

20. A method of electrocatalytic splitting of water, comprising:
placing an electrode comprising the composition of claim 13 in an electrochemical cell containing an electrolyte solution comprising water and an electrolyte;
applying a potential to the electrode; and
the potential causing electrocatalytic splitting of the water.

21. The method according to claim 20, the electrocatalytic splitting of the water resulting in hydrogen evolution.

* * * * *